(12) United States Patent
Ying et al.

(10) Patent No.: US 11,317,451 B2
(45) Date of Patent: Apr. 26, 2022

(54) SESSION ACTIVATION METHOD, DEVICE, AND SYSTEM

(71) Applicant: HUAWEI TECHNOLOGIES CO., LTD., Guangdong (CN)

(72) Inventors: Jiangwei Ying, Beijing (CN); Yanmei Yang, Beijing (CN); Qiang Deng, Shenzhen (CN); Meng Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 25 days.

(21) Appl. No.: 16/773,025

(22) Filed: Jan. 27, 2020

(65) Prior Publication Data

US 2020/0163134 A1 May 21, 2020

Related U.S. Application Data

(63) Continuation of application No. PCT/CN2018/097669, filed on Jul. 27, 2018.

(30) Foreign Application Priority Data

Jul. 28, 2017 (CN) .......................... 201710633686.1

(51) Int. Cl.
*H04W 36/00* (2009.01)
*H04W 76/19* (2018.01)
*H04W 76/12* (2018.01)

(52) U.S. Cl.
CPC ........... *H04W 76/12* (2018.02); *H04W 36/00* (2013.01)

(58) Field of Classification Search
CPC . H04W 36/0011; H04W 76/12; H04W 36/00; H04W 36/0033; H04W 76/11; H04W 76/19; H04W 76/27; H04W 76/10
See application file for complete search history.

(56) References Cited

U.S. PATENT DOCUMENTS

| 2009/0013087 A1* | 1/2009 | Lorch | H04W 76/14 |
| | | | 709/232 |
| 2011/0216709 A1* | 9/2011 | Noldus | H04W 76/40 |
| | | | 370/328 |

(Continued)

FOREIGN PATENT DOCUMENTS

| CN | 101394588 A | 3/2009 |
| CN | 101998567 A | 3/2011 |

(Continued)

OTHER PUBLICATIONS

Office Action dated Oct. 16, 2020, issued in counterpart of Chinese Patent Application No. 201710633686.1 with English Translation. (14 pages).

(Continued)

*Primary Examiner* — Nathan S Taylor
(74) *Attorney, Agent, or Firm* — WHDA, LLP

(57) ABSTRACT

A session activation method, device, and system, and relate to the field of the communications technologies, to resolve an existing problem of relatively high signaling overheads during PDU session activation. The method includes: receiving, by a control plane node, indication information from an AMF node, where the indication information is used to indicate that the AMF node receives a service request message sent by a terminal device; and sending, by the control plane node, an identifier of a to-be-activated PDU session of the terminal device to an SMF node or the AMF node based on the indication information.

12 Claims, 14 Drawing Sheets

(56) References Cited

U.S. PATENT DOCUMENTS

| | | | | |
|---|---|---|---|---|
| 2017/0238242 | A1* | 8/2017 | Noldus | H04W 8/18 |
| | | | | 455/434 |
| 2018/0227872 | A1* | 8/2018 | Li | H04W 76/20 |
| 2018/0227873 | A1* | 8/2018 | Vrzic | H04W 76/12 |
| 2018/0270713 | A1* | 9/2018 | Park | H04W 74/0833 |
| 2018/0270791 | A1* | 9/2018 | Park | H04W 76/27 |
| 2018/0270792 | A1* | 9/2018 | Park | H04W 76/28 |
| 2018/0270894 | A1* | 9/2018 | Park | H04W 68/02 |
| 2018/0324576 | A1* | 11/2018 | Salkintzis | H04W 60/04 |
| 2018/0352483 | A1* | 12/2018 | Youn | H04W 76/11 |
| 2018/0376444 | A1* | 12/2018 | Kim | H04W 4/70 |
| 2019/0007500 | A1* | 1/2019 | Kim | H04L 67/141 |
| 2019/0007992 | A1* | 1/2019 | Kim | H04W 64/006 |
| 2019/0313479 | A1* | 10/2019 | Myhre | H04L 67/1004 |
| 2019/0380104 | A1* | 12/2019 | Vrzic | H04W 28/26 |
| 2020/0059989 | A1* | 2/2020 | Velev | H04W 8/08 |
| 2020/0154515 | A1* | 5/2020 | Ni | H04L 67/142 |
| 2020/0163145 | A1* | 5/2020 | Park | H04W 76/18 |
| 2021/0211960 | A1* | 7/2021 | Ryu | H04W 76/12 |
| 2021/0212160 | A1* | 7/2021 | Velev | H04W 48/18 |
| 2021/0360715 | A1* | 11/2021 | Myhre | H04L 45/64 |

FOREIGN PATENT DOCUMENTS

| | | |
|---|---|---|
| CN | 102217332 A | 10/2011 |
| CN | 103517452 A | 1/2014 |
| CN | 105813079 A | 7/2016 |
| EP | 2157748 B1 | 7/2012 |
| EP | 3477993 A1 | 5/2019 |
| EP | 3637943 A1 | 4/2020 |
| WO | 2007080558 A2 | 7/2007 |
| WO | 2017019118 A1 | 2/2017 |
| WO | 2018141269 A1 | 8/2018 |

OTHER PUBLICATIONS

LG Electronics Inc., TS 23.502: UE triggered PDU Session Activation procedure in connected mode. SA WG2 Meeting #119, Feb. 13-17, 2017, Dubrovnik, Croatia, S2-170851. (6 pages).

Office Action dated Feb. 26, 2020, issued in counterpart CN Application No. 201710633686.1, with English Translation. (10 pages).

International Search Report dated Oct. 11, 2018, issued in counterpart Application No. PCT/CN2018/097669, with English Translation. (11 pages).

3GPP TS 23.502, V0.5.0,-"3rd Generation Partnership Project; Technical Specification Group Services and System Aspects; Procedures for the 5G System; Stage 2 (Release 15)",Jul. 14, 2017 (Jul. 14, 2017), pp. 1-148, XP051336671, cited in Extended European Search Report dated Jun. 3, 2020. (pp. 148).

3GPP TS 23. 501 ,V1.2.0,"3rd Generation Partnership Project; Technical Specification Group Services and System Aspects; System Architecture for the 5G System; Stage 2 (Release 15)",Jul. 26, 2017 (Jul. 26, 2017), pp. 1-166, XP051336684, cited in Extended European Search Report dated Jun. 3, 2020. (pp. 166).

Extended (Supplementary) European Search Report dated Jun. 3, 2020, issued in counterpart application No. 18838478.8. (12 pages).

* cited by examiner

SESSION ACTIVATION METHOD, DEVICE, AND SYSTEM

CROSS-REFERENCE TO RELATED APPLICATIONS

This application is a continuation of International Application No. PCT/CN2018/097669, filed on Jul. 27, 2018, which claims priority to Chinese Patent Application No. 201710633686.1, filed on Jul. 28, 2017. The disclosures of the aforementioned applications are hereby incorporated by reference in their entireties.

TECHNICAL FIELD

Embodiments of the present disclosure relate to the field of communications technologies, and in particular, to a session activation method, device, and system.

BACKGROUND

A 5th generation (5G) mobile communications system is the most advanced mobile communications technology network currently, and can provide a super-capacity bandwidth rate and securer communication for a mobile user. The 5G system mainly includes devices such as a core network, a wireless network, and user equipment (UE).

In the 5G system, different devices mainly transmit service data by using a session. For example, the UE and a network device may transmit the service data by using a protocol data unit (PDU) session. Usually, the UE and the network device establish a PDU session, and the established PDU session is in an inactive state. The PDU session is activated when the service data needs to be transmitted between the UE and the network device. In the 5G system, a signaling interaction procedure shown in FIG. 1 may be used to activate a PDU session to transmit service data. As shown in FIG. 1, an UE sends a service request message to an access and mobility management function (AMF) node through a radio access network (RAN), to request to activate the PDU session. After receiving the service request message, the AMF node instructs a session management function (SMF) node to activate a corresponding PDU session, so that the UE transmits uplink data to a user plane function (UPF) node by using the PDU session.

However, in an application scenario of a multi-slice multi-public data network (PDN) session (multiple slices multiple PDN sessions) in the 5G system, a plurality of PDU sessions in the inactive state may exist between the UE and the network device, and the UE initiates a PDU session activation procedure for each PDU session. Consequently, signaling overheads are high.

SUMMARY

Embodiments of the present disclosure provide a session activation method, device, and system, to resolve an existing problem of relatively high signaling overheads during PDU session activation.

To achieve the foregoing objective, the following technical solutions are used in the embodiments of the present disclosure:

According to one aspect, an embodiment of the present disclosure provides a session activation method, including:

receiving, by a control plane node, indication information from an AMF node, where the indication information is used to indicate that the AMF node receives a service request message sent by a terminal device; and sending, by the control plane node, an identifier of a to-be-activated PDU session of the terminal device to an SMF node or the AMF node based on the indication information, so that after receiving the identifier of the to-be-activated PDU session from the control plane node or receiving the identifier of the to-be-activated PDU session from the AMF node, the SMF node activates the to-be-activated PDU session based on the identifier of the to-be-activated PDU session.

In this embodiment of the present disclosure, when triggering a service request procedure, the terminal device sends the service request message to the AMF node. The service request message is used to request to switch the terminal device from an idle state to a connected state, or is used to request to activate a PDU session of the terminal device. That the terminal device is in the idle state means: No non-access stratum (NAS) signaling connection is established between the terminal device and the AMF node. That the terminal device is in the connected state may mean: A NAS signaling connection has been established between the terminal device and the AMF node.

The identifier of the to-be-activated PDU session is used to identify the to-be-activated PDU session of the terminal device, and the to-be-activated PDU session of the terminal device is a to-be-activated PDU session.

Compared with the prior art, in the technical solution provided in this embodiment of the present disclosure, when the terminal device exchanges information with the AMF node once, in other words, when the terminal device initiates a service request procedure once, the identifier of the to-be-activated PDU session of the terminal device is determined, and a PDU session that may be activated in the future is activated. This is unnecessarily the same as the prior art in which the PDU session is activated only when data corresponding to the PDU session needs to be sent, and consequently the terminal device initiates a plurality of times of PDU session activation procedures. In the technical solution provided in this embodiment of the present disclosure, the quantity of times of initiating a PDU session activation procedure by the terminal device is reduced, and signaling overheads are reduced.

With reference to the aspect, in a possible implementation, the sending, by the control plane node, an identifier of a to-be-activated PDU session of the terminal device to an SMF node or the AMF node based on the indication information may include:

obtaining, by the control plane node, an activation-related parameter of the terminal device based on the indication information, determining the to-be-activated PDU session of the terminal device based on the obtained activation-related parameter, and sending the identifier of the determined to-be-activated PDU session to the SMF node or the AMF node.

The activation-related parameter is used to determine the to-be-activated PDU session of the terminal device.

Therefore, the control plane node may determine the to-be-activated PDU session of the terminal device based on the activation-related parameter without using a determining result for another device, to reduce signaling overheads caused by mutual interaction between devices.

With reference to the possible implementation, in another possible implementation, the determining, by the control plane node, the to-be-activated PDU session of the terminal device based on the activation-related parameter may specifically include but is not limited to the following implementations:

(1) When the activation-related parameter includes a correspondence between a location area and a PDU session of the terminal device, the control plane node determines, as the to-be-activated PDU session based on a location area in which the terminal device is currently located and the correspondence, a PDU session corresponding to the location area in which the terminal device is currently located.

The PDU session that is of the terminal device and that corresponds to the location area in the correspondence includes a PDU session that has a relatively high activation frequency (for example, an activation frequency is greater than a preset threshold, that is, the PDU session is frequently activated) when the terminal device is located in the location area.

The location area may be an area in a network concept, for example, a cell (cell), a tracking area (TA), or a tracking area list (TAL); or may be a geographical location, for example, a Haidian district or a Chaoyang district; or may be an area at a finer granularity, for example, Zhongguancun in a Haidian district.

The location area in which the terminal device is currently located may be determined by the control plane node based on location information obtained from the AMF node. For example, the control plane node may receive, from the AMF node, the location information used to indicate the location area in which the terminal device is located, and determine, based on the location information, the location area in which the terminal device is currently located.

Optionally, the activation-related parameter in the manner (1) may be obtained by the control plane node from an SMF node that manages the PDU session of the terminal device or from the AMF node, or may be determined by the control plane node based on mobility statistics data obtained from the AMF node.

(2) When the activation-related parameter may include an initial activation moment and an activation period that are of at least one PDU session of the terminal device, the control plane node may determine an estimated activation moment of the at least one PDU session based on the initial activation moment and the activation period that are of the at least one PDU session, and determine, as the to-be-activated PDU session, a PDU session that is in the at least one PDU session and whose time difference between an estimated activation moment and a current moment is less than or equal to a first preset threshold.

The estimated activation moment of the PDU session is a moment that is after the current moment and that differs from a previous activation moment of the PDU session by one activation period, the previous activation moment of the PDU session is an activation moment that is before the current moment and that is adjacent to the current moment, and the activation moment is a moment at which the PDU session is activated.

The initial activation moment of the PDU session is a moment at which the PDU session is activated for the first time, and the activation period of the PDU session is a time interval between two adjacent activation moments of the PDU session.

The initial activation moment and the activation period that are of the PDU session may be set based on a requirement. This is not limited in this embodiment of the present disclosure. The first preset threshold may be set based on a requirement. This is not limited in this embodiment of the present disclosure. When the time difference between the estimated activation moment of the PDU session and the current moment is less than or equal to the first preset threshold, it indicates that the PDU session is to be activated in a short time after the current moment. For example, the PDU session is to be activated in a current service request procedure. When the time difference between the estimated activation moment of the PDU session and the current moment is greater than the first preset threshold, it indicates that the PDU session is not activated in a short time after the current moment. For example, the PDU session is not activated as the to-be-activated PDU session in a current service request procedure.

Optionally, the activation-related parameter in the manner (2) may be obtained by the control plane node from an SMF that manages the PDU session of the terminal device.

(3) When the activation-related parameter includes a fixed activation moment of at least one PDU session of the terminal device, the control plane node determines, as the to-be-activated PDU session, a PDU session that is in the at least one PDU session and whose time difference between a fixed activation moment and a current moment is less than or equal to a second preset threshold.

The fixed activation moment of the PDU session may mean that the PDU session is activated at each activation moment, and the fixed activation moment may be set based on a requirement. This is not limited in this embodiment of the present disclosure. It may be understood that the fixed activation moment compared with the current moment is a fixed activation moment after the current moment.

The second preset threshold may be set based on a requirement. This is not limited in this embodiment of the present disclosure. When the time difference between the fixed activation moment of the PDU session and the current moment is less than or equal to the second preset threshold, it indicates that the PDU session is to be activated in a short time after the current moment. For example, the PDU session is to be activated in a current service request procedure. When the time difference between the fixed activation moment of the PDU session and the current moment is greater than the second preset threshold, it indicates that the PDU session is not activated in a short time after the current moment. For example, the PDU session is not activated as the to-be-activated PDU session in a current service request procedure.

Optionally, the activation-related parameter in the manner (3) may be obtained by the control plane node from an SMF that manages the PDU session of the terminal device.

(4) When the activation-related parameter includes a correspondence between a PDU session of the terminal device and an associated PDU session, the control plane node determines, as the to-be-activated PDU session based on a PDU session that the terminal device requests to activate and the correspondence between the PDU session of the terminal device and the associated PDU session, an associated PDU session corresponding to the PDU session that the terminal device requests to activate.

In the correspondence between the PDU session of the terminal device and the associated PDU session, the associated PDU session corresponding to the PDU session of the terminal device is a PDU session to be activated in a preset time after the PDU session of the terminal device is activated. The preset time may be set based on a requirement. This is not limited in this embodiment of the present disclosure.

It should be noted that in a process of implementing the manner (4), the service request message includes an identifier of the PDU session that the terminal device requests to activate. After receiving the service request message, the AMF node sends the indication information and the identifier of the PDU session to the control plane node. For example, when receiving the indication information from the AMF node, the control plane node further receives the identifier of the PDU session that the terminal device requests to activate. Optionally, the indication information and the identifier of the PDU session that the terminal device requests to activate may be carried in one signaling message, or may be carried in different signaling messages. This is not limited in this embodiment of the present disclosure.

Optionally, the activation-related parameter in the manner (4) may be obtained by the control plane node from an SMF that manages the PDU session of the terminal device or from the AMF node.

Therefore, the control plane node may determine the to-be-activated PDU session based on a mobility characteristic of the terminal device or a characteristic of the PDU session of the terminal device (for example, the activation period or the fixed activation moment of the PDU session or an association between PDU sessions).

With reference to any one of the aspect or the possible implementations of the aspect, in another possible implementation, the method may further include: enabling, by the control plane node, a prediction function of the control plane node based on information related to a first prediction function.

The information related to the first prediction function may include but is not limited to at least one of the following information: a device type of the terminal device, a service type supported by the terminal device, subscription data of the terminal device, a request message reported by the terminal device, information indicating whether the SMF node supports the prediction function of the control plane node, and information indicating whether the AMF node supports the prediction function of the control plane node. The request message is used to request the control plane node to enable the prediction function of the control plane node.

The prediction function of the control plane node is a function of determining the to-be-activated PDU session by the control plane node.

Optionally, the control plane node may obtain the information related to the first prediction function from the SMF node or the AMF node.

Therefore, the control plane node may enable the prediction function of the control plane node only after referencing some information, and the control plane node does not need to enable the prediction function after being enabled. This can improve prediction security of the control plane node while reducing power consumption of the control plane node.

With reference to any one of the aspect or the possible implementations of the aspect, in another feasible implementation, the control plane node in this embodiment of the present disclosure may be a network data analysis (NWDA) function node, or may be a policy control function (PCF) node.

It should be noted that when the control plane node is the NWDA node, interaction between the AMF node and the NWDA node may be as follows: The AMF node directly interacts with the NWDA node; or the AMF node may interact with the NWDA node by using the PCF node. To be specific, the AMF node first sends information to the PCF node, and the NWDA node receives, from the PCF node, the information sent by the AMF node.

When the control plane node is the PCF node, the activation-related parameter and the information related to the first prediction function may be obtained by the PCF node from another node. This obtaining manner is the same as a manner in which the NWDA node obtains the activation-related parameter and the information related to the first prediction function. Details are not described herein again. Alternatively, the activation-related parameter and the information related to the first prediction function may be obtained by the PCF node from the NWDA node. For example, before the PCF node determines the to-be-activated PDU session of the terminal device based on the activation-related parameter, the PCF node may receive the activation-related parameter from the NWDA node. Before the PCF node enables the prediction function of the PCF node based on the information related to the first prediction function, the PCF node may receive the information related to the first prediction function from the NWDA node.

Therefore, in a communications system, a plurality of different control plane nodes may implement the technical solution provided in this embodiment of the present disclosure, so that flexibility of performing the solution is improved.

With reference to any one of the aspect or the possible implementations of the aspect, in another possible implementation, the sending, by the control plane node, an identifier of a to-be-activated PDU session of the terminal device to an SMF node or the AMF node may include:

sending, by the control plane node, an activation request message to the SMF node, where the activation request message includes the identifier of the to-be-activated PDU session, and the activation request message is used to request the SMF node to activate the to-be-activated PDU session; or sending, by the control plane node, a response message to the AMF node, where the response message includes the identifier of the to-be-activated PDU session, and the response message is used to instruct the AMF node to send the identifier of the to-be-activated PDU session to the SMF node.

Therefore, the control plane node may add the identifier of the to-be-activated PDU session to a message, and send the message to the SMF node or the AMF node, to improve security of sending the identifier of the to-be-activated PDU session.

According to one aspect, an embodiment of the present disclosure provides a control plane node, including:

a receiving unit, configured to receive indication information from an AMF node, where the indication information is used to indicate that the AMF node receives a service request message sent by a terminal device; and a processing unit, configured to send an identifier of a to-be-activated PDU session of the terminal device to an SMF node or the AMF node by using a sending unit based on the indication information received by the receiving unit, so that after receiving the identifier of the to-be-activated PDU session from the control plane node or receiving the identifier of the to-be-activated PDU session from the AMF node, the SMF node activates the to-be-activated PDU session based on the identifier of the to-be-activated PDU session.

For a specific implementation of the control plane node, refer to a behavior function of the control plane node in the session activation method provided in the foregoing aspect or the possible implementations of the foregoing aspect. Details are not described herein again. Therefore, the control plane node provided in the aspect can achieve same beneficial effects as the foregoing aspect.

According to one aspect, an embodiment of this application provides a control plane node. The control plane node may implement a function performed by the control plane node in the foregoing method embodiment. The function may be implemented by hardware, or may be implemented by hardware executing corresponding software. The hardware or the software includes one or more modules corresponding to the foregoing function.

In a possible design, a structure of the control plane node includes a processor and a communications interface. The processor is configured to support the control plane node in performing a corresponding function in the foregoing method. The communications interface is configured to support the control plane node in communicating with another network element. The control plane node may further include a memory. The memory is configured to be coupled to the processor, and stores a program instruction and data that are necessary for the control plane node.

According to one aspect, an embodiment of this application provides a computer storage medium, configured to store a computer software instruction used by the foregoing control plane node. The computer software instruction includes a program used to perform the solution in the foregoing aspect.

According to one aspect, an embodiment of this application provides a computer program product, and the program product stores a computer software instruction used by the foregoing control plane node. The computer software instruction includes a program used to perform the solution in the foregoing aspect.

According to one aspect, an embodiment of this application provides an apparatus. The apparatus exists in a product form of a chip. A structure of the apparatus includes a processor and a memory. The memory is configured to be coupled to the processor, and stores a program instruction and data that are necessary for the apparatus. The processor is configured to execute the program instruction stored in the memory, so that the apparatus performs a function of the control plane node in the foregoing method.

According to another aspect, an embodiment of the present disclosure provides a session activation method. The method may include:

receiving, by an AMF node, a service request message sent by a terminal device; and sending, by the AMF node, indication information to a control plane node based on the service request message, where the indication information is used to indicate that the AMF node receives the service request message sent by the terminal device, so that the control plane node sends an identifier of a to-be-activated PDU session of the terminal device to the AMF node or an SMF node based on the indication information.

The service request message is used to request to switch the terminal device from an idle state to a connected state. When the AMF node receives the service request message sent by the terminal device, it indicates that the terminal device initiates a service request procedure, and the terminal device switches from the idle state to the connected state in the service request procedure.

Alternatively, the service request message is used to request to activate a PDU session of the terminal device. When the AMF node receives the service request message sent by the terminal device, it indicates that the terminal device initiates a service request procedure, and activates the PDU session of the terminal device in the service request procedure.

Compared with the prior art, in the technical solution provided in this embodiment of the present disclosure, when the terminal device initiates the service request procedure, the AMF node sends the indication information to the control plane node. The indication information is used to indicate that the AMF node receives the service request message sent by the terminal device. Therefore, the control plane node sends the identifier of the to-be-activated PDU session of the terminal device to another node, so that the another node activates the to-be-activated PDU session based on the identifier of the to-be-activated PDU session, to activate, in a service request procedure initiated by the terminal device once, a PDU session that needs to be activated in the future. This is unnecessarily the same as the prior art in which the PDU session is activated only when data corresponding to the PDU session needs to be sent, and consequently the terminal device initiates a plurality of times of PDU session activation procedures. In the technical solution provided in this embodiment of the present disclosure, a quantity of times of initiating a PDU session activation procedure by the terminal device is reduced, and signaling overheads are reduced.

With reference to the aspect, in a possible implementation, when the terminal device requests to activate a PDU session, the service request message may include an identifier of a PDU session that the terminal device requests to activate. The method further includes:

sending, by the AMF node to the control plane node, the identifier of the PDU session that the terminal device requests to activate, so that the control plane node sends, to the SMF node, the identifier of the PDU session that the terminal device requests to activate, and the SMF node activates the PDU session based on the identifier of the PDU session that the terminal device requests to activate; or determining, by the AMF based on the identifier of the PDU session that the terminal device requests to activate, a DNN of the PDU session that the terminal device requests to activate, and sending, to the control plane node, the DNN of the PDU session that the terminal device requests to activate; or determining, by the AMF node based on the identifier of the PDU session that the terminal device requests to activate, NSSAI of the PDU session that the terminal device requests to activate, and sending, to the control plane node, the NSSAI of the PDU session that the terminal device requests to activate; or determining, by the AMF node based on the identifier of the PDU session that the terminal device requests to activate, a DNN and NSSAI that are of the PDU session that the terminal device requests to activate, and sending, to the control plane node, the NSSAI and the DNN that are of the PDU session that the terminal device requests to activate.

It should be noted that in the embodiments of the present disclosure, the AMF node may receive, by using an access network node, the service request message sent by the terminal device. For example, the access network node receives, by using radio resource control (radio resource control, RRC) signaling, the service request message sent by the terminal device, and then the access network node sends the service request message to the AMF node by using N2 interface signaling. After receiving the N2 interface signaling, the AMF node obtains, through decapsulation, the identifier of the PDU session that the terminal device requests to activate, and then sends the identifier of the PDU session to the control plane node through encapsulation.

Therefore, the PDU session that the terminal device requests to activate may be activated in the service request procedure initiated by the terminal device.

With reference to any one of the aspect or the possible implementations of the aspect, in another possible implementation, the method may further include:

receiving, by the AMF node, the identifier of the to-be-activated PDU session of the terminal device from the control plane node; and sending, by the AMF node, an activation request message to the SMF node, where the activation request message includes the identifier of the to-be-activated PDU session of the terminal device, and the activation request message is used to request the SMF node to activate the to-be-activated PDU session.

It should be noted that when the service request message includes an identifier of the PDU session that the terminal device requests to activate, and an SMF node that activates the PDU session requested by the terminal device and an SMF node that activates the to-be-activated PDU session of the terminal device are the same SMF node, the activation request message sent by the AMF node to the SMF node further includes the identifier of the PDU session that the terminal device requests to activate. When the service request message includes the identifier of the PDU session that the terminal device requests to activate, and an SMF node that activates the PDU session requested by the terminal device and an SMF node that activates the to-be-activated PDU session of the terminal device are different SMF nodes (for example, the SMF node that activates the PDU session requested by the terminal device is an SMF node 1, and the SMF node that activates the to-be-activated PDU session of the terminal device is an SMF node 2), when the AMF node sends, to the SMF node 2, the activation request message that includes the identifier of the to-be-activated PDU session of the terminal device, the AMF node further needs to send, to the SMF node 1, the activation request message that includes the identifier of the PDU session that the terminal device requests to activate.

Therefore, the AMF node may send the received identifier of the to-be-activated PDU session to the SMF node, so that the SMF node activates the PDU session based on the identifier.

With reference to any one of the aspect or the possible implementations of the aspect, in another possible implementation, the control plane node may be an NWDA node or a PCF node.

Therefore, the AMF node may receive identifiers that are of the to-be-activated PDU sessions and that are sent by different nodes, to improve flexibility of implementing the solution.

According to another aspect, an embodiment of the present disclosure provides an AMF node, including:

a receiving unit, configured to receive a service request message sent by a terminal device; and a sending unit, configured to send indication information to a control plane node based on the service request message, where the indication information is used to indicate that the AMF node receives the service request message sent by the terminal device, so that after receiving the indication information, the control plane node sends an identifier of a to-be-activated PDU session of the terminal device to the AMF node or an SMF node based on the indication information.

For a specific implementation of the AMF node, refer to a behavior function of the AMF node in the session activation method provided in the foregoing aspect or the possible implementations of the foregoing aspect. Details are not described herein again. Therefore, the AMF node provided in the aspect can achieve same beneficial effects as the foregoing aspect.

According to another aspect, an embodiment of this application provides an AMF node. The AMF node may implement a function performed by the AMF node in the foregoing method embodiment. The function may be implemented by hardware, or may be implemented by hardware executing corresponding software. The hardware or the software includes one or more modules corresponding to the foregoing function.

In a possible design, a structure of the AMF node includes a processor and a communications interface. The processor is configured to support the AMF node in performing a corresponding function in the foregoing method. The communications interface is configured to support the AMF node in communicating with another network element. The AMF node may further include a memory. The memory is configured to be coupled to the processor, and stores a program instruction and data that are necessary for the AMF node.

According to another aspect, an embodiment of this application provides a computer storage medium, configured to store a computer software instruction used by the foregoing AMF node. The computer software instruction includes a program used to perform the solution in the foregoing aspect.

According to another aspect, an embodiment of this application provides a computer program product, and the program product stores a computer software instruction used by the foregoing AMF node. The computer software instruction includes a program used to perform the solution in the foregoing aspect.

According to another aspect, an embodiment of this application provides an apparatus. The apparatus exists in a product form of a chip. A structure of the apparatus includes a processor and a memory. The memory is configured to be coupled to the processor, and stores a program instruction and data that are necessary for the apparatus. The processor is configured to execute the program instruction stored in the memory, so that the apparatus performs a function of the AMF node in the foregoing method.

According to still another aspect, an embodiment of the present disclosure provides a session activation method. The method may include:

receiving, by an AMF node, a service request message sent by a terminal device; and sending, by the AMF node, an identifier of a to-be-activated PDU session of the terminal device to an SMF node based on the service request message, so that the SMF node activates the to-be-activated PDU session based on the identifier of the to-be-activated PDU session.

The service request message is used to request to switch the terminal device from an idle state to a connected state, or activate a PDU session of the terminal device. When the AMF receives the service request message sent by the terminal device, it indicates that the terminal device initiates the service request procedure for switching the terminal device from the idle state to the connected state or activating the PDU session of the terminal device.

The identifier of the to-be-activated PDU session is used to identify the to-be-activated PDU session of the terminal device, and the to-be-activated PDU session is a to-be-activated PDU session of the terminal device.

Compared with the prior art, in the technical solution provided in this embodiment of the present disclosure, when the terminal device exchanges information with the AMF node once, in other words, when the terminal device initiates a service request procedure once, the identifier of the to-be-activated PDU session of the terminal device is determined, and a PDU session that may be activated in the future is activated. This is unnecessarily the same as the prior art in which the PDU session is activated only when data corresponding to the PDU session needs to be sent, and consequently the terminal device initiates a plurality of times of PDU session activation procedures. In the technical solution provided in this embodiment of the present disclosure, the quantity of times of initiating a PDU session activation procedure by the terminal device is reduced, and signaling overheads are reduced.

With reference to the aspect, in a possible implementation, the sending, by the AMF node, an identifier of a to-be-activated PDU session of the terminal device to an SMF node based on the service request message includes:

obtaining, by the AMF node, an activation-related parameter of the terminal device based on the service request message; and determining, by the AMF node, the to-be-activated PDU session of the terminal device based on the activation-related parameter, and sending the identifier of the to-be-activated PDU session to the SMF node.

The activation-related parameter may be obtained by the AMF node from an NWDA node, or may be obtained by the AMF node from a PCF node.

Therefore, the AMF node may determine the to-be-activated PDU session of the terminal device based on the activation-related parameter without using a determining result of a to-be-activated PDU session of another device, to reduce signaling overheads caused by mutual interaction between devices.

With reference to the possible implementation, in another possible implementation, for a process of performing a manner in which the AMF node determines the to-be-activated PDU session of the terminal device based on the activation-related parameter, refer to a manner in which the control plane node determines the to-be-activated PDU session of the terminal device based on the activation-related parameter. Details are not described herein again.

Therefore, the AMF node may determine the to-be-activated PDU session based on a mobility characteristic of the terminal device or a characteristic of the PDU session of the terminal device (for example, the activation period or the fixed activation moment of the PDU session or an association between PDU sessions).

With reference to any one of the aspect or the possible implementations of the aspect, in another possible implementation, the method may further include: enabling, by the AMF node, a prediction function of the AMF node based on information related to a second prediction function.

The information related to the second prediction function includes but is not limited to at least one of the following information: a device type of the terminal device, a service type supported by the terminal device, subscription data of the terminal device, a request message reported by the terminal device, and information indicating whether the AMF node supports the prediction function of the control plane node. The request message is used to request the AMF node to enable the prediction function of the AMF node.

The prediction function of the AMF node may be a function of determining the to-be-activated PDU session of the terminal device by the AMF node.

Therefore, the AMF node may enable the prediction function of the AMF node only after referencing some information, and the AMF node does not need to enable the prediction function after being enabled. This can improve prediction security of the AMF node while reducing power consumption of the AMF node.

With reference to any one of the aspect or the possible implementations of the aspect, in another possible implementation, the service request message includes an identifier of a PDU session that the terminal device requests to activate. The method may further include:

sending, by the AMF node to the SMF node, the identifier of the PDU session that the terminal device requests to activate, so that the SMF node activates, based on the identifier of the PDU session, the PDU session that the terminal device requests to activate.

Therefore, the AMF node may send, to the SMF node, the identifier of the PDU session that the terminal device requests to activate and the identifier of the to-be-activated PDU session, so that the SMF node activates the to-be-activated PDU session when activating the PDU session that the terminal device requests to activate.

With reference to the possible implementations of the aspect, in another feasible implementation, the AMF node may send an activation request message to the SMF node.

The activation request message includes the identifier of the PDU session that the terminal device requests to activate and the identifier of the to-be-activated PDU session of the terminal device. The activation request message is used to request the SMF node to activate the PDU session requested by the terminal device and the to-be-activated PDU session of the terminal device.

It should be noted that when an SMF node that activates the PDU session requested by the terminal device and an SMF node that activates the to-be-activated PDU session of the terminal device are the same SMF node, the AMF node sends the activation request message to the same SMF node. When an SMF node that activates the PDU session requested by the terminal device and an SMF node that activates the to-be-activated PDU session of the terminal device are different SMF nodes (for example, the SMF node that activates the PDU session requested by the terminal device is an SMF node 1, and the SMF node that activates the to-be-activated PDU session of the terminal device is an SMF node 2), when the AMF node sends, to the SMF node 2, the activation request message that includes the identifier of the to-be-activated PDU session of the terminal device, the AMF node further needs to send, to the SMF node 1, the activation request message that includes the identifier of the PDU session that the terminal device requests to activate.

Therefore, the AMF node may encapsulate, in the activation request message, the identifier of the PDU session that the terminal device requests to activate and the identifier of the to-be-activated PDU session of the terminal device, and send the activation request message to the SMF node. This improves security of sending the identifier.

With reference to any one of the aspect or the possible implementations of the aspect, in another feasible implementation, the method may further include:

receiving, by the AMF node, a first session message from the SMF node, and sending the first session message and some other information (for example, a security context and a handover restriction list) to an access network node, so that the access network node establishes an RRC connection reconfiguration with the terminal device based on the first session message, and establishes security between the terminal device and the access network node based on the some other information;

receiving, by the AMF node, a second session message from the access network node, where the second session message includes access network channel information (RAN N3 tunnel information), a list of accepted QoS flows for the activated PDU sessions (list of accepted QoS flows for the PDU Sessions activated), and a list of rejected QoS flows for the activated PDU sessions (list of rejected QoS flows for the PDU Sessions activated); and sending, by the AMF node, the second session message to the SMF node.

Therefore, the PDU session is activated through information exchange between the AMF node and the SMF node.

According to still another aspect, an embodiment of the present disclosure provides an AMF node, including:

a receiving unit, configured to receive a service request message sent by a terminal device; and a processing unit, configured to send an identifier of a to-be-activated PDU session of the terminal device to an SMF node by using a sending unit based on the service request message received by the receiving unit, so that the SMF node activates the to-be-activated PDU session based on the identifier of the to-be-activated PDU session.

For a specific implementation of the AMF node, refer to a behavior function of the AMF node in the session activation method provided in the foregoing still another aspect or the possible implementations of the foregoing still another aspect. Details are not described herein again. Therefore, the AMF node provided in the aspect can achieve same beneficial effects as the foregoing aspect.

According to still another aspect, an embodiment of this application provides an AMF node. The AMF node may implement a function performed by the AMF node in the method embodiment in the foregoing still another aspect. The function may be implemented by hardware, or may be implemented by hardware executing corresponding software. The hardware or the software includes one or more modules corresponding to the foregoing function.

In a possible design, a structure of the AMF node includes a processor and a communications interface. The processor is configured to support the AMF node in performing a corresponding function in the foregoing method. The communications interface is configured to support the AMF node in communicating with another network element. The AMF node may further include a memory. The memory is configured to be coupled to the processor, and stores a program instruction and data that are necessary for the AMF node.

According to still another aspect, an embodiment of this application provides a computer storage medium, configured to store a computer software instruction used by the foregoing AMF node. The computer software instruction includes a program used to perform the solution in the foregoing still another aspect.

According to still another aspect, an embodiment of this application provides a computer program product, and the program product stores a computer software instruction used by the foregoing AMF node. The computer software instruction includes a program used to perform the solution in the foregoing still another aspect.

According to still another aspect, an embodiment of this application provides an apparatus. The apparatus exists in a product form of a chip. A structure of the apparatus includes a processor and a memory. The memory is configured to be coupled to the processor, and stores a program instruction and data that are necessary for the apparatus. The processor is configured to execute the program instruction stored in the memory, so that the apparatus performs a function of the AMF node in the method in the foregoing still another aspect.

According to still another aspect, an embodiment of the present disclosure provides a session activation method. The method may include:

determining, by a terminal device based on an activation-related parameter, to activate a to-be-activated PDU session of the terminal device; and sending, by the terminal device, an identifier of the to-be-activated PDU session of the terminal device to an AMF node, so that the AMF node sends the identifier of the to-be-activated PDU session of the terminal device to an SMF, and the SMF node activates the to-be-activated PDU session based on the identifier of the to-be-activated PDU session.

Compared with the prior art, in the technical solution provided in this embodiment of the present disclosure, the terminal device may determine the to-be-activated PDU session (namely, the to-be-activated PDU session of the terminal device) based on the activation-related parameter, and send the identifier of the to-be-activated PDU session to the AMF node, so that the AMF node sends the identifier of the to-be-activated PDU session to the SMF node, to complete activation of the to-be-activated PDU session. Therefore, the terminal device may notify the AMF node of the to-be-activated PDU session of the terminal device during one time of interaction with the AMF node, and activate a PDU session that may be activated in the future. This is unnecessarily the same as the prior art in which the PDU session is activated only when data corresponding to the PDU session needs to be sent, and consequently the terminal device initiates a plurality of times of PDU session activation procedures. In the technical solution provided in this embodiment of the present disclosure, the quantity of times of initiating a PDU session activation procedure by the terminal device is reduced, and signaling overheads are reduced.

With reference to the aspect, in a possible implementation, for a process of performing a manner in which the terminal device determines the to-be-activated PDU session of the terminal device based on the activation-related parameter, refer to a manner in which the control plane node determines the to-be-activated PDU session of the terminal device based on the activation-related parameter. Details are not described herein again.

Therefore, the terminal device may determine the to-be-activated PDU session based on a mobility characteristic of the terminal device or a characteristic of the PDU session of the terminal device (for example, the activation period or the fixed activation moment of the PDU session or an association between PDU sessions).

With reference to the possible implementation, in another possible implementation, the terminal device may obtain the activation-related parameter from a network entity function node in a registration procedure or a terminal device configuration update procedure. The network entity function node is the AMF node, an NWDA node, or a policy control function PCF node.

For the registration procedure or the terminal device configuration update procedure, refer to the prior art. Details are not described herein.

Therefore, the terminal device may obtain the activation-related parameter during normal interaction with another node to determine the to-be-activated PDU session of the terminal device, and the terminal device does not need to temporarily determine the to-be-activated PDU session through new signaling interaction with the another node, so that a quantity of times of interaction between the terminal device and the another node is reduced, and signaling overheads are reduced.

With reference to any one of the aspect or the possible implementations of the aspect, in another possible implementation, before the determining, by a terminal device based on an activation-related parameter, to activate a to-be-activated PDU session of the terminal device, the method may further include: enabling, by the terminal device, a prediction function of the terminal device based on information related to a third prediction function.

The information related to the third prediction function includes but is not limited to at least one of the following information: a device type of the terminal device, a service type supported by the terminal device, and subscription data of the terminal device.

Therefore, the terminal device may enable the prediction function of the terminal device only after referencing some information, and the terminal device does not need to enable the prediction function after being powered on. This can improve prediction security of the terminal device while reducing power consumption of the terminal device.

With reference to any one of the aspect or the possible implementations of the aspect, in another possible implementation, the method may further include:

triggering, by the terminal device, a service request procedure, and sending a service request message to the AMF node, where the service request message is used to request to switch the terminal device from an idle state to a connected state, or the service request message includes an identifier of a PDU session that the terminal device requests to activate, and the service request message is used to request to activate a PDU session of the terminal device.

The terminal device may trigger the service request procedure in the following cases: 1. The terminal device needs to perform signaling interaction with the AMF node to change from the idle state to the connected mode. 2. The terminal device is in the connected state, and data transmission is performed on a PDU session of the terminal device. 3. The terminal device needs to perform signaling interaction with the AMF node to change from the idle state to the connected mode, and data transmission is performed on a PDU session of the terminal device.

According to still another aspect, an embodiment of the present disclosure provides a terminal device, including:

a determining unit, configured to determine, based on an activation-related parameter, to activate a to-be-activated PDU session of the terminal device; and a sending unit, configured to send, to an AMF node, an identifier of the to-be-activated PDU session that is of the terminal device and that is determined by the determining unit, so that the AMF node sends the identifier of the to-be-activated PDU session of the terminal device to an SMF, and the SMF node activates the to-be-activated PDU session based on the identifier of the to-be-activated PDU session.

For a specific implementation of the terminal device, refer to a behavior function of the terminal device in the session activation method provided in the foregoing still another aspect or the possible implementations of the foregoing still another aspect. Details are not described herein again. Therefore, the terminal device provided in the aspect can achieve same beneficial effects as the foregoing aspect.

According to still another aspect, an embodiment of this application provides a terminal device. The terminal device may implement a function performed by the terminal device in the method embodiment in the foregoing still another aspect. The function may be implemented by hardware, or may be implemented by hardware executing corresponding software. The hardware or the software includes one or more modules corresponding to the foregoing function.

In a possible design, a structure of the terminal device includes a processor and a communications interface. The processor is configured to support the terminal device in implementing a corresponding function in the foregoing method. The communications interface is configured to support the terminal device in communicating with another network element. The terminal device may further include a memory. The memory is configured to be coupled to the processor, and stores a program instruction and data that are necessary for the terminal device.

According to still another aspect, an embodiment of this application provides a computer storage medium, configured to store a computer software instruction used by the foregoing terminal device. The computer software instruction includes a program used to perform the solution in the foregoing still another aspect.

According to still another aspect, an embodiment of this application provides a computer program product, and the program product stores a computer software instruction used by the foregoing terminal device. The computer software instruction includes a program used to perform the solution in the foregoing still another aspect.

According to still another aspect, an embodiment of this application provides an apparatus. The apparatus exists in a product form of a chip. A structure of the apparatus includes a processor and a memory. The memory is configured to be coupled to the processor, and stores a program instruction and data that are necessary for the apparatus. The processor is configured to execute the program instruction stored in the memory, so that the apparatus performs a function of the terminal device in the method in the foregoing still another aspect.

According to still another aspect, an embodiment of the present disclosure provides a session activation method. The method may include:

receiving, by an SMF node, indication information from an AMF node, where the indication information is used to indicate that the AMF node receives a service request message sent by a terminal device; and activating, by the SMF node, a to-be-activated PDU session of the terminal device based on the indication information.

An identifier of the to-be-activated PDU session is used to identify the to-be-activated PDU session of the terminal device, and the to-be-activated PDU session of the terminal device is a to-be-activated PDU session.

Compared with the prior art, in the technical solution provided in this embodiment of the present disclosure, when the terminal device exchanges information with the AMF node once, in other words, when the terminal device initiates a service request procedure once, a PDU session that may be activated in the future is activated. This is unnecessarily the same as the prior art in which the PDU session is activated only when data corresponding to the PDU session needs to be sent, and consequently the terminal device initiates a plurality of times of PDU session activation procedures. In the technical solution provided in this embodiment of the present disclosure, the quantity of times of initiating a PDU session activation procedure by the terminal device is reduced, and signaling overheads are reduced.

With reference to the aspect, in a possible implementation, the activating a to-be-activated PDU session of the terminal device based on the indication information includes:

obtaining, by the SMF node, an activation-related parameter of the terminal device based on the indication information; and determining, by the SMF node, the to-be-activated PDU session of the terminal device based on the activation-related parameter, and activates the to-be-activated PDU session.

The activation-related parameter may be obtained by the SMF node from an NWDA node, a PCF node, or the AMF node.

For a process of performing a manner in which the SMF node determines the to-be-activated PDU session of the terminal device based on the activation-related parameter, refer to a manner in which the control plane node determines the to-be-activated PDU session of the terminal device based on the activation-related parameter. Details are not described herein again.

Therefore, the SMF node may determine the to-be-activated PDU session based on a mobility characteristic of the terminal device or a characteristic of the PDU session of the terminal device (for example, the activation period or the fixed activation moment of the PDU session or an association between PDU sessions).

With reference to any one of the aspect or the possible implementations of the aspect, in another possible implementation, the method may further include: enabling, by the SMF node, a prediction function of the SMF node based on information related to a fourth prediction function.

The information related to the fourth prediction function may include but is not limited to at least one of the following information: a device type of the terminal device, a service type supported by the terminal device, subscription data of the terminal device, a request message reported by the terminal device, and information indicating whether the SMF node supports the prediction function of the SMF node. The request message is used to request the SMF node to enable the prediction function of the SMF node.

The prediction function of the SMF node is a function of determining the to-be-activated PDU session by the SMF node.

Therefore, the SMF node may enable the prediction function of the SMF node only after referencing some information, and the SMF node does not need to enable the prediction function after being enabled. This can improve prediction security of the SMF node while reducing power consumption of the SMF node.

With reference to any one of the aspect or the possible implementations of the aspect, in another feasible implementation, for a process in which the SMF node activates the to-be-activated PDU session of the terminal device, refer to an existing process in which the SMF node activates the PDU session. The process may specifically include: sending, by the SMF node, a first session message to the AMF node;

receiving, by the SMF node, a second session message from the AMF node; and sending, by the SMF node, a response message to the AMF node through an interface N11.

The first session message includes some information related to the to-be-activated PDU session, for example, may include a quality of service profile (QoS profile) and core network channel information (CN N3 tunnel information). The CN N3 tunnel information is used by an access network node to correctly send data of the terminal device to a corresponding UPF node. The QoS profile includes QoS parameter information corresponding to all QoS flows for the to-be-activated PDU session, and the QoS profile is used by the access network node to establish an air interface bearer.

The second session message includes access network channel information (RAN N3 tunnel information), a list of accepted QoS flows for the activated PDU sessions (list of accepted QoS flows for the PDU Sessions activated), and a list of rejected QoS flows for the activated PDU sessions (list of rejected QoS flows for the PDU Sessions activated). The RAN N3 tunnel information is used by a UPF node to correctly send data of the terminal device to a corresponding access network node.

Optionally, the SMF node may send the first session message to the AMF node through the interface N11, and receive the second session message from the AMF node through the interface N11.

Therefore, the PDU session is activated through information exchange between the SMF node and the AMF node.

With reference to the possible implementation, in another feasible implementation, when a dynamic policy control and charging (PCC) policy is deployed in the technical solution provided in this embodiment of the present disclosure, the method may further include:

initiating, by the SMF node, an internet protocol-connectivity access network session establishment (internet protocol-connectivity access network session establishment, IP-CAN Session Establishment) procedure; and configuring, by the SMF node, the RAN N3 tunnel information in the second session message on the UPF node, where the RAN N3 tunnel information is used by the UPF node to correctly send the data of the terminal device to the corresponding access network node.

Optionally, for a process in which the SMF node initiates the IP-CAN session establishment, refer to the prior art (for example, the SMF node reports a location of the terminal device to the PCF node). Details are not described herein.

Therefore, the SMF node may execute the PCC policy through interaction with the UPF node.

According to still another aspect, an embodiment of the present disclosure provides an SMF node, including:

a receiving unit, configured to receive indication information from an AMF node, where the indication information is used to indicate that the AMF node receives a service request message sent by a terminal device; and an activation unit, configured to activate a to-be-activated PDU session of the terminal device based on the indication information received by the receiving unit.

For a specific implementation of the SMF node, refer to a behavior function of the SMF node in the session activation method provided in the foregoing still another aspect or the possible implementations of the foregoing still another aspect. Details are not described herein again. Therefore, the SMF node provided in the aspect can achieve same beneficial effects as the foregoing aspect.

According to still another aspect, an embodiment of this application provides an SMF node. The SMF node may implement a function performed by the SMF node in the method embodiment in the foregoing still another aspect. The function may be implemented by hardware, or may be implemented by hardware executing corresponding software. The hardware or the software includes one or more modules corresponding to the foregoing function.

In a possible design, a structure of the SMF node includes a processor and a communications interface. The processor is configured to support the SMF node in performing a corresponding function in the foregoing method. The communications interface is configured to support the SMF node in communicating with another network element. The SMF node may further include a memory. The memory is configured to be coupled to the processor, and stores a program instruction and data that are necessary for the SMF node.

According to still another aspect, an embodiment of this application provides a computer storage medium, configured to store a computer software instruction used by the foregoing SMF node. The computer software instruction includes a program used to perform the solution in the foregoing still another aspect.

According to still another aspect, an embodiment of this application provides a computer program product, and the program product stores a computer software instruction used by the foregoing SMF node. The computer software instruction includes a program used to perform the solution in the foregoing still another aspect.

According to still another aspect, an embodiment of this application provides an apparatus. The apparatus exists in a product form of a chip. A structure of the apparatus includes a processor and a memory. The memory is configured to be coupled to the processor, and stores a program instruction and data that are necessary for the apparatus. The processor is configured to execute the program instruction stored in the memory, so that the apparatus performs a function of the SMF node in the method in the foregoing still another aspect.

According to still another aspect, an embodiment of the present disclosure provides a session activation method. The method may include:

receiving, by an SMF node, an identifier of a to-be-activated PDU session of a terminal device from an AMF node or a control plane node, where the identifier of the to-be-activated PDU session is determined by the control plane node based on indication information received from the AMF node, and the indication information is used to indicate that the AMF node receives a service request message sent by the terminal device; and activating, by the SMF node, the PDU session based on the identifier of the to-be-activated PDU session.

When the AMF node receives the service request message sent by the terminal device, it indicates that the terminal device initiates a service request procedure to the AMF node. The identifier of the to-be-activated PDU session is used to identify the to-be-activated PDU session of the terminal device, and the to-be-activated PDU session of the terminal device is a to-be-activated PDU session.

Compared with the prior art, in the technical solution provided in this embodiment of the present disclosure, when the terminal device initiates a service request procedure once to the AMF node, a PDU session that may be activated in the future is activated. This is unnecessarily the same as the prior art in which the PDU session is activated only when data corresponding to the PDU session needs to be sent, and consequently the terminal device initiates a plurality of times of PDU session activation procedures. In the technical solution provided in this embodiment of the present disclosure, the quantity of times of initiating a PDU session activation procedure by the terminal device is reduced, and signaling overheads are reduced.

With reference to any one of the aspect or the possible implementations of the aspect, in another feasible implementation, for a process in which the SMF node activates the to-be-activated PDU session of the terminal device, refer to a process in which the SMF node activates the PDU session in the possible implementations of the foregoing aspect. Details are not described herein again.

According to still another aspect, an embodiment of the present disclosure provides an SMF node, including:

a receiving unit, configured to receive an identifier of a to-be-activated PDU session of a terminal device from an AMF node or a control plane node, where the identifier of the to-be-activated PDU session is determined by the control plane node based on indication information received from the AMF node, and the indication information is used to indicate that the AMF node receives a service request message sent by the terminal device; and an activation unit, configured to activate the to-be-activated PDU session of the terminal device based on the identifier of the to-be-activated PDU session.

For a specific implementation of the SMF node, refer to a behavior function of the SMF node in the session activation method provided in the foregoing still another aspect or the possible implementations of the foregoing still another aspect. Details are not described herein again. Therefore, the SMF node provided in the aspect can achieve same beneficial effects as the foregoing aspect.

According to still another aspect, an embodiment of this application provides an SMF node. The SMF node may implement a function performed by the SMF node in the method embodiment in the foregoing still another aspect. The function may be implemented by hardware, or may be implemented by hardware executing corresponding software. The hardware or the software includes one or more modules corresponding to the foregoing function.

In a possible design, a structure of the SMF node includes a processor and a communications interface. The processor is configured to support the SMF node in performing a corresponding function in the foregoing method. The communications interface is configured to support the SMF node in communicating with another network element. The SMF node may further include a memory. The memory is configured to be coupled to the processor, and stores a program instruction and data that are necessary for the SMF node.

According to still another aspect, an embodiment of this application provides a computer storage medium, configured to store a computer software instruction used by the foregoing SMF node. The computer software instruction includes a program used to perform the solution in the foregoing still another aspect.

According to still another aspect, an embodiment of this application provides a computer program product, and the program product stores a computer software instruction used by the foregoing SMF node. The computer software instruction includes a program used to perform the solution in the foregoing still another aspect.

According to still another aspect, an embodiment of this application provides an apparatus. The apparatus exists in a product form of a chip. A structure of the apparatus includes a processor and a memory. The memory is configured to be coupled to the processor, and stores a program instruction and data that are necessary for the apparatus. The processor is configured to execute the program instruction stored in the memory, so that the apparatus performs a function of the SMF node in the method in the foregoing still another aspect.

According to still another aspect, an embodiment of the present disclosure provides a session activation system. The system includes a terminal device, the AMF node according to any one of the another aspect or the possible implementations of the another aspect, the control plane node according to any one of the foregoing aspect or the possible implementations of the foregoing aspect, and an SMF node. Alternatively, the system includes a terminal device, and the AMF node, the control plane node, and the SMF node according to any one of the still another aspect or the possible implementations of the still another aspect. Alternatively, the system includes the terminal device, the AMF node, the control plane node, and the SMF node according to any one of the still another aspect or the possible implementations of the still another aspect. Alternatively, the system includes a terminal device, an AMF node, a control plane node, and the SMF node according to any one of the still another aspect or the possible implementations of the still another aspect.

DESCRIPTION OF EMBODIMENTS

The following describes implementations of the embodiments of the present disclosure in detail with reference to accompanying drawings.

Figure 1:
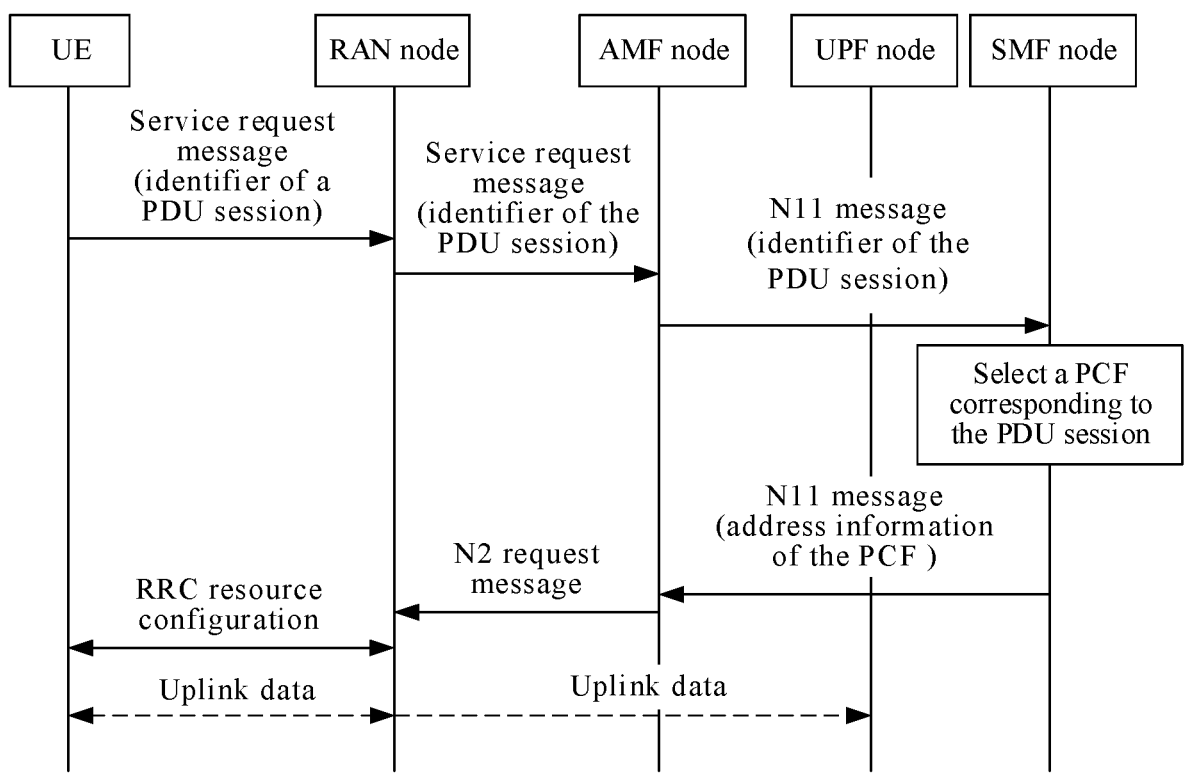
FIG. 1 is a schematic flowchart of signaling interaction in the prior art.
Figure 2:
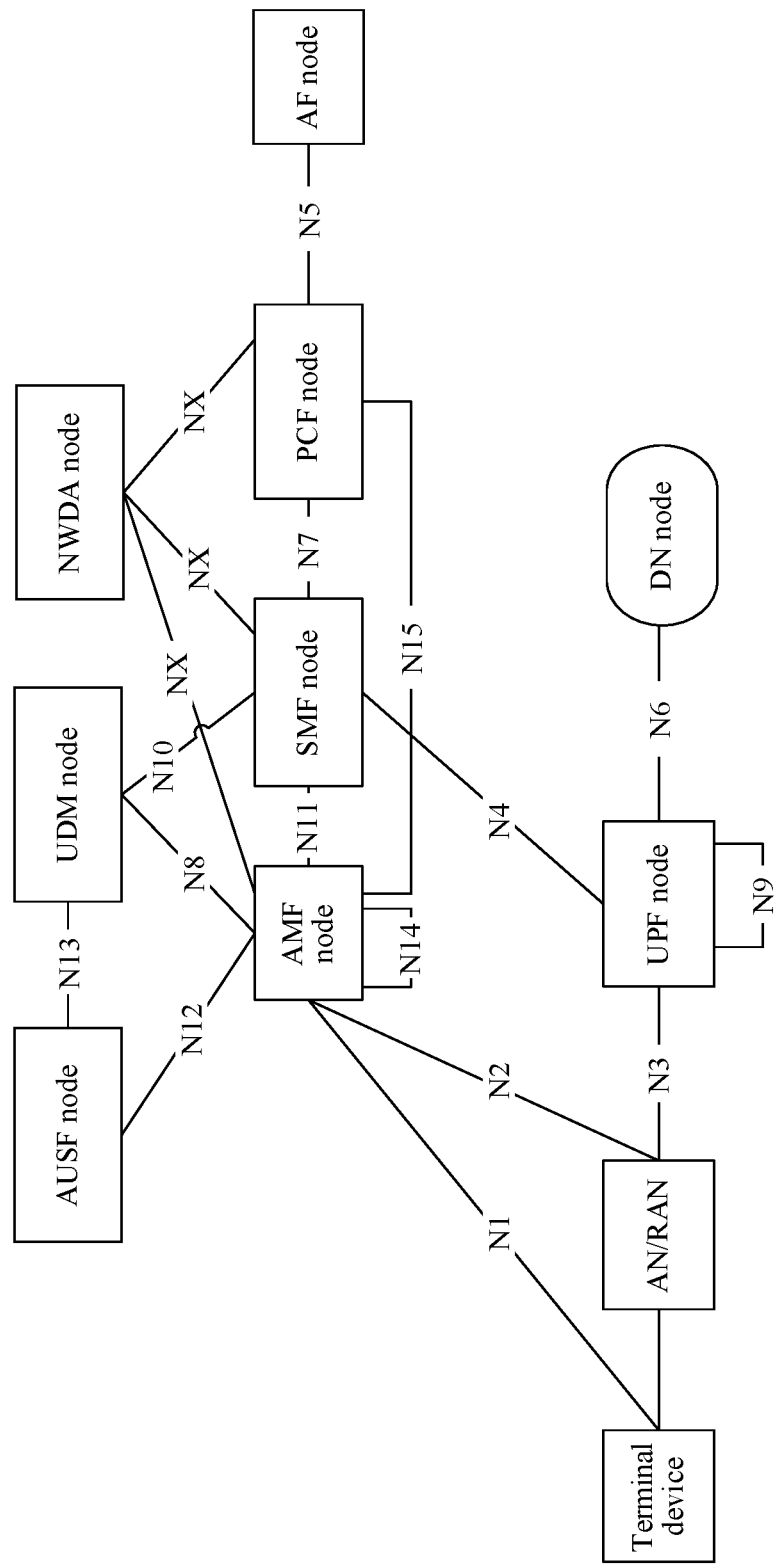
FIG. 2 is a simplified schematic diagram of a system architecture according to an embodiment of the present disclosure.

A session activation method provided in the embodiments of the present disclosure may be applied to any communications system that has a PDU session activation requirement, for example, may be applied to a 5G system shown in FIG. 2.

As shown in FIG. 2, the 5G system may include a terminal device, an access network (AN) node/a radio access network (RAN) node, a data network (DN) node, and the following plurality of network function (NF) nodes: an NWDA node, an authentication server function (AUSF) node, a unified data management (UDM) node, an AMF node, an SMF node, a PCF node, an application function (AF) node, and a UPF node. It may be understood that FIG. 2 merely shows an example of an architectural diagram. In addition to the function nodes shown in FIG. 2, the 5G system may include another function node. This is not limited in the embodiments of the present disclosure.

In the 5G system shown in FIG. 2, the function nodes may establish a connection through a next generation (NG) network interface to implement communication. For example, the terminal device may establish a control plane signaling connection to the AMF node through an interface N1 (N1). The AN/RAN node may establish a user plane data connection to the UPF node through an interface N3 (N3). The AN/RAN node may establish a control plane signaling connection to the AMF node through an interface N2 (N2). The UPF node may establish a control plane signaling connection to the SMF node through an interface N4 (N4). The UPF node may exchange user plane data with the DN node through an interface N6 (N6). The AMF node may establish a control plane signaling connection to the UDM node through an interface N8 (N8). The AMF node may establish a control plane signaling connection to the AUSF node through an interface N12 (N12). The AMF node may establish a control plane signaling connection to the SMF node through an interface N11 (N11). The SMF node may establish a control plane signaling connection to the PCF node through an interface N7 (N7). The AMF node may establish a control plane signaling connection to the NWDA node through an interface NX1 (NX1, which is an interface that is not defined in the 5G system standard). The SMF node may establish a control plane signaling connection to the NWDA node through an interface NX2 (an interface that is not defined in the 5G system standard). The PCF node may establish a control plane signaling connection to the AF node through an interface N5 (N5). The PCF node may establish a control plane signaling connection to the NWDA node through an interface NX3 (an interface that is not defined in the 5G system standard). The AUSF node may establish a control plane signaling connection to the UDM node through an interface N13 (N13).

The terminal device in FIG. 2 may be UE, or may be a cellular phone, a cordless telephone set, a session initiation protocol (SIP) phone, a smartphone, a wireless local loop (WLL) station, a personal digital assistant (PDA), a laptop computer, a handheld communications device, a handheld computing device, a satellite radio device, a wireless modem card, and/or another device configured to perform communication in a wireless system. The AN/RAN node is a network including a plurality of 5G-AN/5G-RAN nodes, and is configured to implement a radio physical layer function, a resource scheduling and radio resource management function, a radio access control function, and a mobility management function. The 5G-AN/5G-RAN node may be an access node, a next generation NodeB (gNB), a transmission reception point (TRP), a transmission point (TP), or another access network device. The UDM node, the AUSF node, the NWDA node, the PCF node, the AMF node, the SMF node, and the UPF node may be collectively referred to as the NF nodes. The NWDA node and the PCF node in the NF nodes may be referred to as control plane (CP) nodes, and the UPF node may be referred to as a user plane function (UPF) node. Nodes other than the UPF node in the NF nodes may work independently, or may be combined together to implement some control functions. For example, these nodes are combined together and then may complete access control and mobility management functions of the terminal device such as access authentication, security encryption, and location registration, session management functions such as user plane transmission path establishment, release, and change, and a function of analyzing data (for example, congestion) related to some slices and data related to the terminal device. The UPF node mainly completes a function such as routing and forwarding of user plane data, for example, is responsible for data packet filtering, data transmission/forwarding, rate control, charging information generation, and the like for the terminal device.

Figure 3:
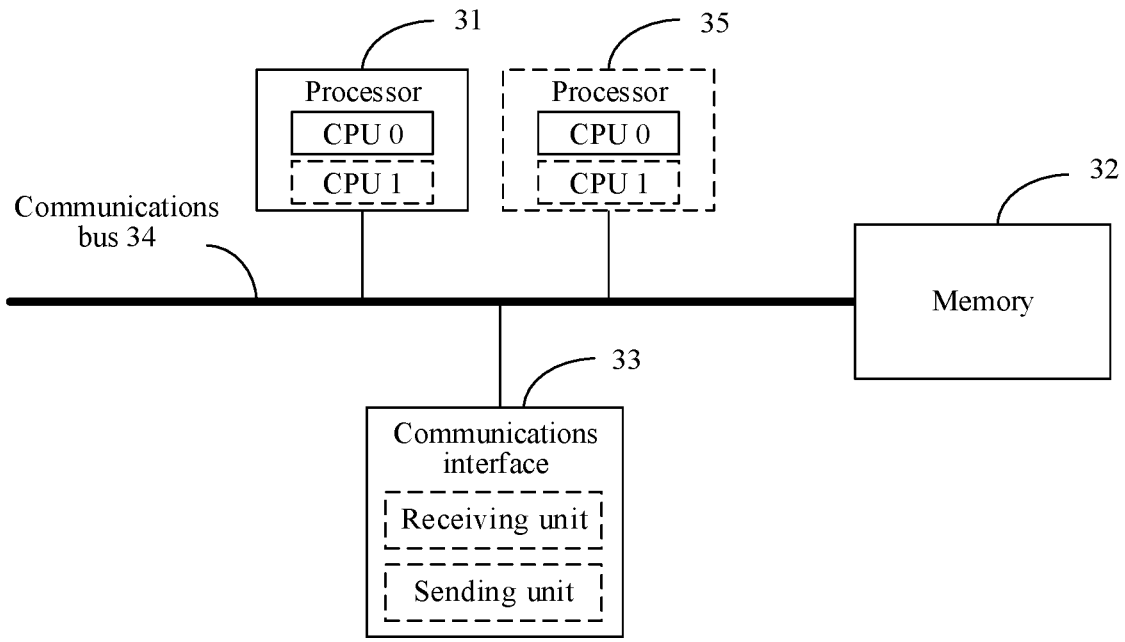
FIG. 3 is a schematic composition diagram of a network function node according to an embodiment of the present disclosure.

Specifically, the UDM node, the AUSF node, the NWDA node, the PCF node, the AMF node, the SMF node, and the UPF node that may be referred to as the network function nodes in FIG. 2 may include components shown in FIG. 3. FIG. 3 is a schematic composition diagram of a network function node according to an embodiment of the present disclosure. As shown in FIG. 3, the network function node may include at least one processor 31, a memory 32, a communications interface 33, and a communications bus 34. It should be noted that a structure of the device shown in FIG. 3 does not constitute a limitation on the network function node. The network function node may include more or fewer components than those shown in the figure, or combine some components, or have different component arrangements. This is not limited in this embodiment of the present disclosure. The following describes the constituent components of the network function node in detail with reference to FIG. 3.

The processor 31 is a control center of the network function node, and may be a processor, or may be a collective term for a plurality of processing elements. For example, the processor 31 may be a central processing unit (CPU), or an application-specific integrated circuit (ASIC), or one or more integrated circuits configured to implement this embodiment of the present disclosure, for example, one or more microprocessors (DSP) or one or more field programmable gate arrays (FPGA). The processor 31 may perform various functions of the network function node by running or executing a software program stored in the memory 32 and invoking data stored in the memory 32.

In specific implementation, in an embodiment, the processor 31 may include one or more CPUs, for example, a CPU 0 and a CPU 1 that are shown in FIG. 3. In specific implementation, in an embodiment, the network function node may include a plurality of processors, for example, the processor 31 and a processor 35 that are shown in FIG. 3. Each of these processors may be a single-core processor (single-CPU), or may be a multi-core processor (multi-CPU). The processor herein may be one or more devices, circuits, and/or processing cores configured to process data (for example, a computer program instruction).

The memory 32 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium, another magnetic storage device, or any other medium that can be configured to carry or store expected program code in a form of an instruction or a data structure and that can be accessed by a computer. However, the memory 302 is not limited thereto. The memory 32 may exist independently, and is connected to the processor 31 by using the communications bus 34. Alternatively, the memory 32 may be integrated into the processor 31. The memory 32 is configured to store the software program for executing the solution provided in this embodiment of the present disclosure, and the processor 31 controls the execution.

The communications interface 33 is configured to communicate with another device or a communications network, for example, the Ethernet, a RAN, or a wireless local area network (WLAN). The communications interface 33 may include a receiving unit for implementing a receiving function and a sending unit for implementing a sending function.

The communications bus 34 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the communications bus 34 in FIG. 3, but this does not mean that there is only one bus or only one type of bus.

When the network function node shown in FIG. 3 is the NWDA node or the PCF node in the embodiments of the present disclosure, the network function node may perform a function of the NWDA node or the PCF node in the session activation method provided in the embodiments of the present disclosure. For example, the communications interface 33 in the network function node may be configured to receive, from the AMF node, indication information used to indicate that the AMF node receives a service request message sent by the terminal device. The processor 31 in the network function node may be configured to: obtain an activation-related parameter based on the indication information received by the communications interface 33, determine a to-be-activated PDU session of the terminal device based on the activation-related parameter, and send an identifier of the to-be-activated PDU session of the terminal device to the AMF node or the SMF node through the communications interface 33.

When the network function node shown in FIG. 3 is the AMF node in the embodiments of the present disclosure, the AMF node may perform a function of the AMF node in the session activation method provided in the embodiments of the present disclosure. For example, in a feasible implementation, the communications interface 33 in the network function node may be configured to: receive a service request message sent by the terminal device, and send, to the PCF node or the NWDA node or the SMF node, indication information used to indicate that the AMF node receives the service request message sent by the terminal device; and receive an identifier that is of a to-be-activated PDU session of the terminal device and that is sent by the NWDA node or the PCF node, and send the identifier of the to-be-activated PDU session to the SMF node. In another feasible implementation, the communications interface 33 in the network function node may be configured to receive a service request message sent by the terminal device. The processor 31 in the network function node may be configured to: obtain an activation-related parameter of the terminal device based on the service request message, determine a to-be-activated PDU session of the terminal device based on the activation-related parameter, and send an identifier of the to-be-activated PDU session of the terminal device to the SMF node through the communications interface 33.

When the network function node shown in FIG. 3 is the SMF node in the embodiments of the present disclosure, the network function node may be configured to perform a function of the SMF node in the session activation method provided in the embodiments of the present disclosure. For example, in a feasible implementation, the communications interface 33 in the network function node may be configured to receive, from the AMF node, indication information used to indicate that the AMF node receives a service request message sent by the terminal device. The processor 31 in the network function node may be configured to: obtain an activation-related parameter of the terminal device based on the indication information received by the communications interface 33, determine a to-be-activated PDU session of the terminal device based on the activation-related parameter, and activate the to-be-activated PDU session. In another feasible implementation, the communications interface 33 in the network function node may be configured to receive an identifier of a to-be-activated PDU session of the terminal device from the NWDA node or the PCF node. The processor 31 in the network function node may be configured to activate the to-be-activated PDU session based on the identifier that is of the to-be-activated PDU session and that is received by the communications interface 33.

Figure 4:
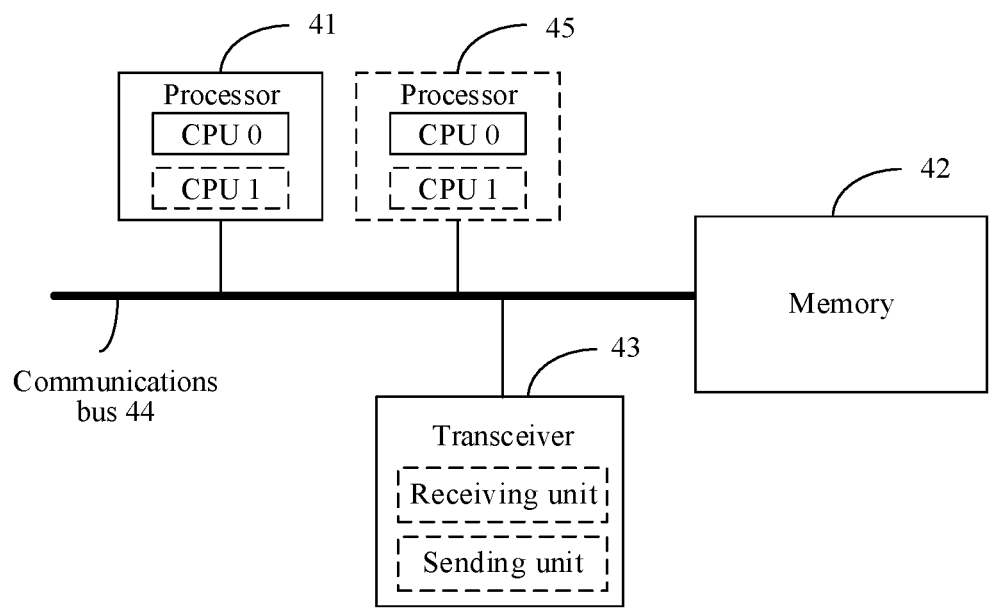
FIG. 4 is a schematic composition diagram of a terminal device according to an embodiment of the present disclosure.

FIG. 4 is a schematic composition diagram of a terminal device according to an embodiment of the present disclosure. As shown in FIG. 4, the terminal device may include at least one processor 41, a memory 42, a transceiver 43, and a communications bus 44. The following describes the constituent components of the terminal device in detail with reference to FIG. 4.

The processor 41 is a control center of the terminal device, and may be a processor, or may be a collective term for a plurality of processing elements. For example, the processor 41 may be a CPU, or an ASIC, or one or more integrated circuits configured to implement this embodiment of the present disclosure, for example, one or more DSPs or one or more FPGAs. The processor 41 may perform various functions of the terminal device by running or executing a software program stored in the memory 42 and invoking data stored in the memory 42.

In specific implementation, in an embodiment, the processor 41 may include one or more CPUs, for example, a CPU 0 and a CPU 1 that are shown in FIG. 4. In specific implementation, in an embodiment, the terminal device may include a plurality of processors, for example, the processor 41 and a processor 45 that are shown in FIG. 4. Each of these processors may be a single-CPU, or may be a multi-CPU. The processor herein may be one or more devices, circuits, and/or processing cores configured to process data (for example, a computer program instruction).

The memory 42 may be a ROM or another type of static storage device that can store static information and instructions, or a RAM or another type of dynamic storage device that can store information and instructions, or may be an EEPROM, a CD-ROM or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 42 is not limited thereto. The memory 42 may exist independently, and is connected to the processor 41 by using the communications bus 44. Alternatively, the memory 42 may be integrated into the processor 41. The memory 42 is configured to store the software program for executing the solution in the present disclosure, and the processor 41 controls the execution.

The transceiver 43 is configured to communicate with another device or a communications network, for example, the Ethernet, a RAN, or a WLAN. The transceiver 43 may include a receiving unit for implementing a receiving function and a sending unit for implementing a sending function. Specifically, the transceiver 43 may be a radio frequency module.

The communications bus 44 may be an ISA bus, a PCI bus, an EISA bus, or the like. The bus may be classified into an address bus, a data bus, a control bus, and the like. For ease of representation, only one thick line is used to represent the communications bus 44 in FIG. 4, but this does not mean that there is only one bus or only one type of bus.

The terminal device shown in FIG. 4 may perform an operation performed by the terminal device in the session activation method provided in the embodiments of this application. For example, in a feasible implementation, the transceiver 43 in the terminal device may be configured to send a service request message to the AMF node. In another feasible implementation, the processor 41 in the terminal device may be configured to determine, based on an activation-related parameter, to activate a to-be-activated PDU session of the terminal device. The transceiver 43 in the terminal device may be configured to send, to the SMF node, an identifier of the to-be-activated PDU session determined by the processor 41, so that the SMF node activates the PDU session based on the identifier of the to-be-activated PDU session.

It should be noted that a structure of the device shown in FIG. 4 does not constitute a limitation on the terminal device. The terminal device may include more or fewer components than those shown in the figure, or combine some components, or have different component arrangements. Although not shown, the terminal device may further include a display, a battery, a camera, a Bluetooth module, a global positioning system (GPS) module, and the like. Details are not described herein.

With reference to the 5G system shown in FIG. 2, the following describes in detail a session activation method provided in embodiments of the present disclosure. Nodes in the following method embodiments may correspondingly include the constituent components shown in FIG. 3 or FIG. 4. It should be noted that although a logical sequence is shown in the following method flowchart, in some cases, the shown or described steps may be performed in a sequence different from the sequence herein.

Figure 5A:
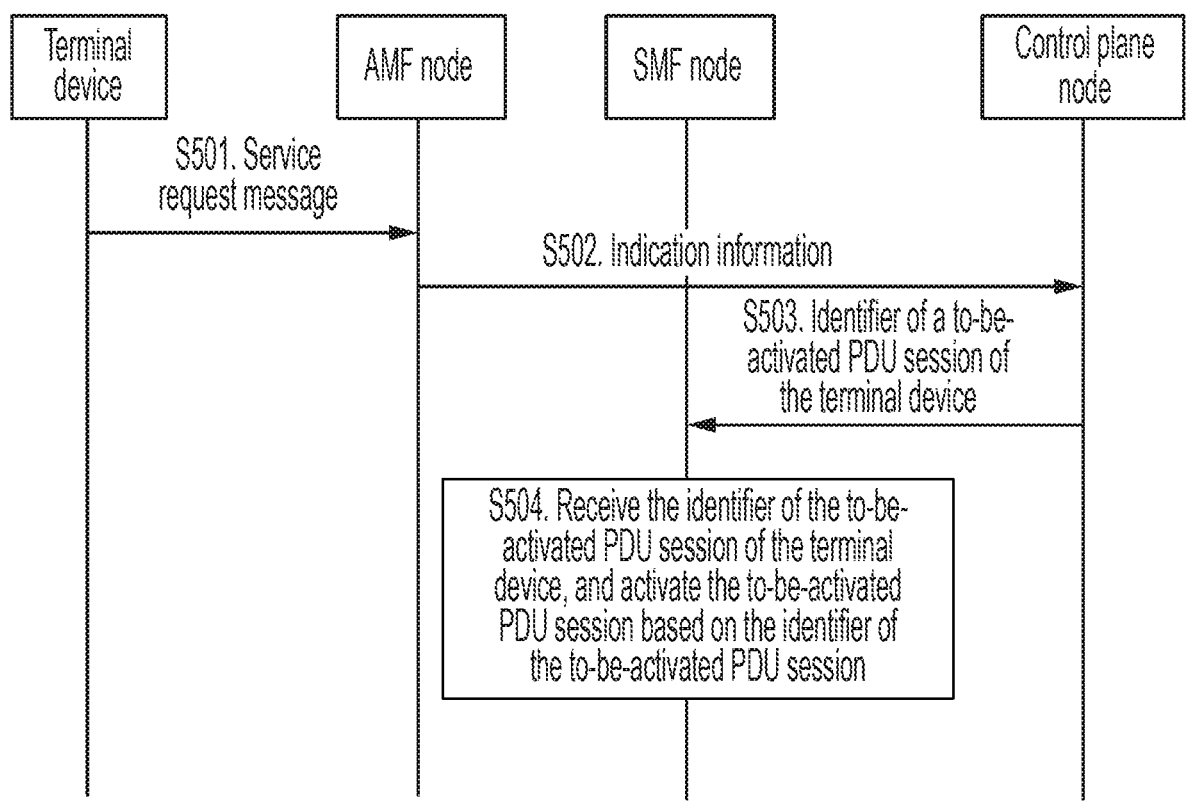
FIG. 5A is a flowchart of a session activation method according to an embodiment of the present disclosure.

FIG. 5A is a flowchart of a session activation method according to an embodiment of the present disclosure. As shown in FIG. 5A, the method may include the following steps.

Step 501: A terminal device sends a service request message to an AMF node.

The terminal device may be the terminal device in the 5G system shown in FIG. 2.

When the terminal device is in an idle state, the service request message may be used to request to switch the terminal device from the idle state to a connected state. Alternatively, when the terminal device is in a connected state, and a PDU session of the terminal device has a data transmission requirement, the service request message may be used to request to activate the PDU session of the terminal device. In this case, the service request message may include an identifier of a PDU session that the terminal device requests to activate. Alternatively, when the terminal device is in an idle state, and a PDU session of the terminal device has a data transmission requirement, the service request message may be used to request to switch the terminal device from the idle state to a connected state, and to request the PDU session of the terminal device. In this case, the service request message may include an identifier of a PDU session that the terminal device requests to activate.

In the embodiments of the present disclosure, the identifier of the PDU session is used to identify the PDU session, and the PDU session is a session used to currently transmit data of the terminal device. Optionally, the identifier of the PDU session is a number, a letter, or another identifier. For example, a number 1 or a letter A may be used as an identifier of a PDU session 1. When the terminal device requests to activate the PDU session 1 to transmit data, the service request message in step 501 may include the number 1 or the letter A. It should be noted that to reduce message sending redundancy, the identifier of the PDU session may be converted into a corresponding bit number. The bit number is added to the service request message for sending.

Further, that the terminal device is in the idle state may mean: No NAS signaling connection is established between the terminal device and the AMF node. That the terminal device is in the connected state may mean: A NAS signaling connection has been established between the terminal device and the AMF node.

Optionally, the terminal device may send the service request message to the AMF node through an interface N1 between the terminal device and the AMF node. The terminal device may alternatively send the service request message to the AMF node by using an access network node. This is not limited.

Step 502: The AMF node receives the service request message sent by the terminal device, and sends indication information to a control plane node based on the service request message.

The indication information is used to indicate that the AMF node receives the service request message sent by the terminal device.

Optionally, that the AMF node sends indication information to a control plane node based on the service request message in step 502 includes:

When the service request message is used as a trigger condition for sending the indication information by the AMF node, and the AMF node receives the service request message, the AMF node sends the indication information to the control plane node.

Alternatively, when determining, based on the service request message, that the terminal device needs to switch from the idle state to the connected state, the AMF node sends the indication information to the control plane node.

Alternatively, when the service request message includes the identifier of the PDU session that the terminal device requests to activate, the AMF node sends the indication information to the control plane node. That the AMF node sends the indication information to the control plane node may include: sending the indication information to the control plane node by using, as the indication information or a part of the indication information, the identifier of the PDU session that the terminal device requests to activate.

Alternatively, when the service request message includes the identifier of the PDU session that the terminal device requests to activate, the AMF node determines, based on the service request message, that the terminal device needs to switch from the idle state to the connected state, and the terminal device requests to activate the PDU session, the AMF node sends the indication information to the control plane node. That the AMF node sends the indication information to the control plane node may include: sending the indication information to the control plane node by using, as the indication information or a part of the indication information, the identifier of the PDU session that the terminal device requests to activate.

The AMF node may identify, in the prior art, that a received message sent by the terminal device is the service request message. For example, the AMF node may determine a type of the message based on information included in a received message header, and determine, based on the type, that the received message is the service request message. A function of the service request message is described in step 501.

In addition, the AMF node may further monitor a status of the terminal device in real time. When the AMF node receives the service request message sent by the terminal device, if the AMF node learns, through monitoring, that the terminal device is currently in an idle state, the AMF node determines that the terminal device needs to switch from the idle state to a connected state. Alternatively, if the service request message includes the identifier of the PDU session that the terminal device requests to activate, and the AMF node learns, through monitoring, that the terminal device is currently in an idle state, the AMF node identifies that the terminal device needs to switch from the idle state to a connected state.

The AMF node may monitor the status of the terminal device in the prior art. Details are not described herein again.

The control plane node may be an NWDA node or a PCF node. For details, refer to FIG. 2.

For example, when the control plane node is the NWDA node, the AMF node may directly exchange information with the NWDA node or exchange information with the NWDA node by using the PCF node. For example, the AMF node may directly send the indication information to the NWDA node, or may send the indication information to the NWDA node by using the PCF node. In other words, the AMF node sends the indication information to the PCF node, and the PCF node sends the indication information to the NWDA node after receiving the indication information.

It should be noted that in a process in which the AMF node sends the indication information to the NWDA node by using the PCF node, information exchanged between the AMF node and the PCF node and information exchanged between the PCF node and the NWDA node may be the same. For example, the AMF node may send the indication information to the PCF node, and the PCF node sends the indication information to the NWDA node. In this case, step 503 may be replaced with the following: The control plane node receives the indication information from the PCF node.

In addition, the information exchanged between the AMF node and the PCF node and the information exchanged between the PCF node and the NWDA node may be different (for example, names, information formats, and included content that are of the two pieces of information are different). For example, the AMF node sends the indication information to the PCF node. The PCF node identifies, based on the indication information, that the AMF node receives the service request message sent by the terminal device. The PCF node sends, to the NWDA node, information used to request to predict a to-be-activated PDU session for the terminal device. In this case, step 502 may be replaced with the following: The AMF node sends the indication information to the PCF node based on the service request message, and the PCF node sends, to the control plane node based on the indication information, the information used to request to predict the to-be-activated PDU session for the terminal device. Correspondingly, step 503 may be replaced with the following: The control plane node receives the information that is used to request to predict the to-be-activated PDU session for the terminal device and that is sent by the PCF node, and sends an identifier of the to-be-activated PDU session of the terminal device to an SMF node based on the information.

Step 503: The control plane node receives the indication information from the AMF node, and sends the identifier of the to-be-activated PDU session of the terminal device to the SMF node based on the indication information.

The identifier of the to-be-activated PDU session is used to identify the to-be-activated PDU session of the terminal device. The to-be-activated PDU session of the terminal device is a to-be-activated PDU session, or a PDU session to be activated in a procedure in which the service request message is triggered.

Optionally, the identifier of the to-be-activated PDU session is a number, a letter, or another identifier. For example, a number 2 or a letter B may be used as an identifier of a to-be-activated PDU session 2. The control plane node may send the number 2 or the letter B to the SMF node, to indicate that the to-be-activated PDU session of the terminal device is the PDU session 2. It should be noted that to reduce information sending redundancy, when the identifier of the to-be-activated PDU session is sent, the identifier may be converted into a corresponding bit number for sending.

The SMF node may be an SMF node corresponding to the to-be-activated PDU session.

Optionally, in a process of establishing a PDU session of the terminal device, a correspondence between the PDU session of the terminal device and an SMF node that manages the PDU session may be prestored in the AMF node and/or the SMF node. When performing step 503, the control plane node may find, based on the stored correspondence, the SMF node corresponding to the to-be-activated PDU session of the terminal device, and send the identifier of the to-be-activated PDU session to the SMF node.

For a process of establishing the PDU session of the terminal device, refer to the prior art. Details are not described herein.

Optionally, when the control plane node is the NWDA node, the control plane node may directly send the identifier of the to-be-activated PDU session of the terminal device to the SMF node, or may send the identifier of the to-be-activated PDU session of the terminal device to the SMF node by using the PCF node. In other words, the NWDA node sends the identifier of the to-be-activated PDU session to the PCF node, and the PCF node sends the identifier of the to-be-activated PDU session to the SMF node after receiving the identifier of the to-be-activated PDU session.

In a process in which the NWDA node sends the identifier of the to-be-activated PDU session of the terminal device to the SMF node by using the PCF node, the NWDA node may add the to-be-activated PDU session to a first message and send the first message to the PCF node, and the PCF node may add the identifier of the to-be-activated PDU session to a second message and send the second message to the SMF node. The first message and the second message may be the same, for example, the first message and the second message may be an activation request message used to request to activate the to-be-activated PDU session. The NWDA node may send the activation request message including the identifier of the to-be-activated PDU session to the PCF node, and the PCF node sends the activation request message to the SMF node. Alternatively, the first message and the second message may be different, for example, the first message may be a response message, and the second message may be an activation request message used to request to activate the to-be-activated PDU session. The NWDA node sends the response message including the identifier of the to-be-activated PDU session to the PCF node, and after obtaining the identifier of the to-be-activated PDU session from the response message, the PCF node sends the activation request message including the identifier of the to-be-activated PDU session to the SMF node. It should be noted that that the first message and the second message are different may mean: Names, message formats, included content, and the like that are of the first message and the second message are different.

It should be noted that that the control plane node sends the identifier of the to-be-activated PDU session to the SMF node may be specifically as follows: The control plane node sends the identifier of the to-be-activated PDU session to the AMF node, and the AMF node sends the identifier of the to-be-activated PDU session to the SMF node after receiving the identifier of the to-be-activated PDU session. Alternatively, the AMF node sends the activation request message to the SMF node after receiving the identifier of the to-be-activated PDU session of the terminal device from the control plane node. The activation request message is used to request the SMF node to activate the to-be-activated PDU session.

Step 504: The SMF node receives the identifier of the to-be-activated PDU session of the terminal device from the control plane node, and activates the to-be-activated PDU session based on the identifier of the to-be-activated PDU session.

Figure 5B:
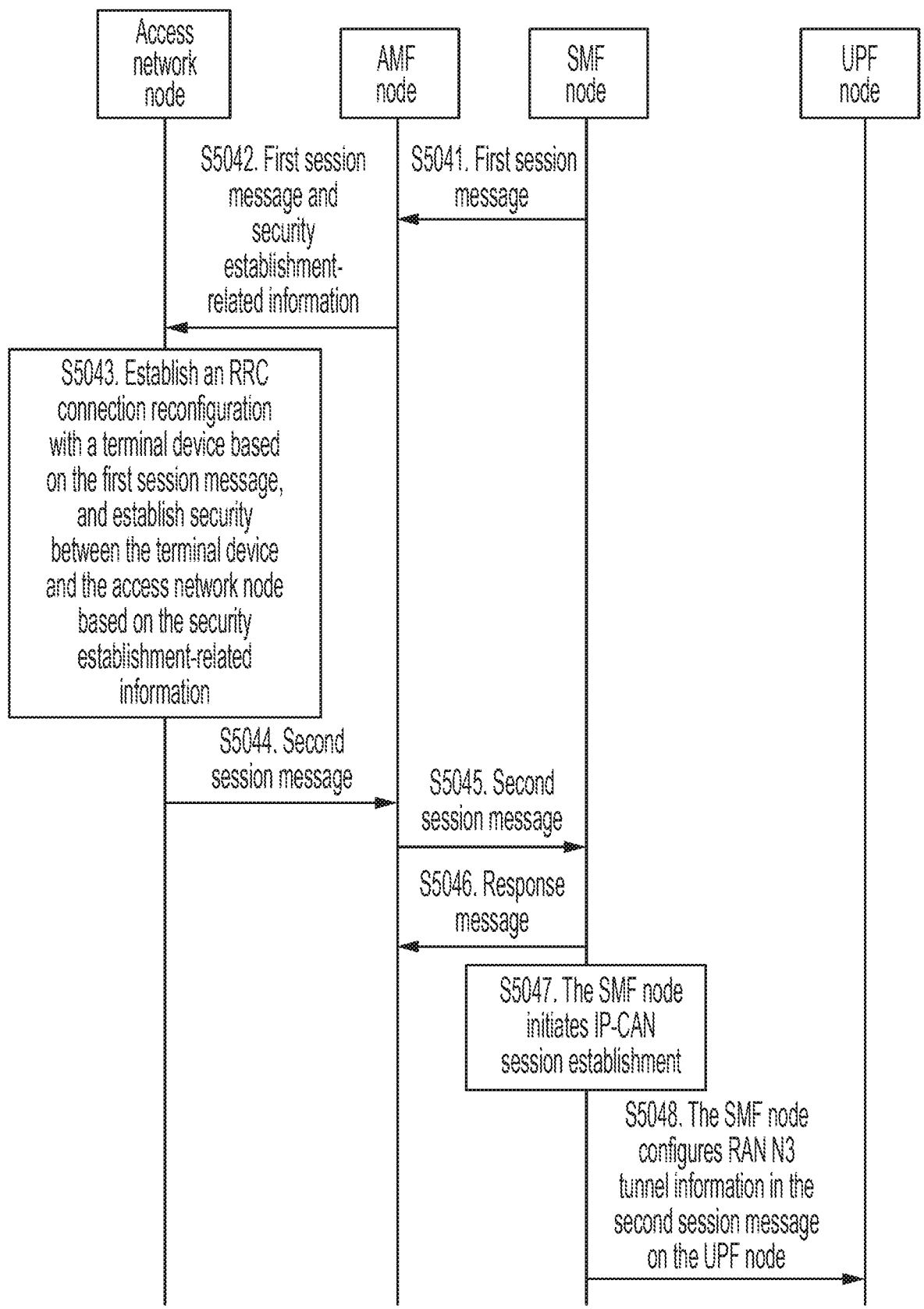
FIG. 5B is a flowchart of a PDU session activation method according to an embodiment of the present disclosure.

For a manner in which the SMF node activates the PDU session, refer to the process in FIG. 5B. Details are not described herein.

It may be understood that FIG. 5A shows an example solution of activating one to-be-activated PDU session of the terminal device. For a process of activating a plurality of to-be-activated PDU sessions of the terminal device, refer to the solution shown in FIG. 5A. Details are not described herein again.

Compared with the prior art, in the technical solution shown in FIG. 5A, when the terminal device sends the service request message to the AMF node, in other words, when the terminal device initiates a service request procedure once, a PDU session that may be activated in the future is activated. That is, the terminal device initiates the service request procedure once to activate a future to-be-activated PDU session. This is unnecessarily the same as the prior art in which the PDU session is activated only when data corresponding to the PDU session needs to be sent, and consequently, the terminal device initiates a plurality of times of PDU session activation procedures. In the technical solution provided in this embodiment of the present disclosure, the quantity of times of initiating a PDU session activation procedure by the terminal device is reduced, and signaling overheads are reduced.

It should be noted that for detailed descriptions of nouns, terms, or steps in the embodiments of this application, reference may be made to each other. Details are not described again.

FIG. 5B is a flowchart of a PDU session activation method according to an embodiment of the present disclosure. As shown in FIG. 5B, the method may include the following steps.

Step 5041: An SMF node sends a first session message to an AMF node.

The first session message may be an N2 interface signaling message, and includes some information related to a to-be-activated PDU session, for example, may include a QoS profile and CN N3 tunnel information. The CN N3 tunnel information is used by an access network node to correctly send data of the terminal device to a corresponding UPF node. The QoS profile includes QoS parameter information corresponding to all QoS flows for the to-be-activated PDU session, and the QoS profile is used by the access network node to establish an air interface bearer.

For a process of performing step 5041, refer to the prior art. Details are not described herein. Optionally, the SMF node may send the first session message to the AMF node through the interface N11 in FIG. 2.

Step 5042: The AMF node receives the first session message from the SMF node, and sends the first session message and security establishment-related information to the access network node.

The security establishment-related information may include a security context.

Optionally, the AMF node may send the first session message and the security establishment-related information to the access network node through the interface N2 in FIG. 2.

Step 5043: The access network node receives the first session message and the security establishment-related information from the AMF node, establishes an RRC connection reconfiguration with the terminal device based on the first session message, and establishes security between the terminal device and the access network node based on the security establishment-related information.

For a process in which the access network node establishes the RRC connection reconfiguration with the terminal device based on the first session message and establishes the security between the terminal device and the access network node based on the security establishment-related information, refer to the prior art. Details are not described herein.

Step 5044: The access network node sends a second session message to the AMF node.

The second session message may include RAN N3 tunnel information, a list of accepted QoS flows for the PDU sessions activated, and a list of rejected QoS flows for the PDU sessions activated.

Optionally, the access network node may send the second session message to the AMF node through the interface N2 in FIG. 2.

Step 5045: The AMF node receives the second session message from the access network node, and sends the second session message to the SMF node.

Step 5046: The SMF node receives the second session message from the AMF node, and sends a response message to the AMF node.

Further, optionally, when a PCC policy is deployed in the technical solution provided in this embodiment of the present disclosure, the method shown in FIG. 5B may further include the following steps:

Step 5047: The SMF node initiates IP-CAN session establishment.

Step 5048: The SMF node configures the RAN N3 tunnel information in the second session message on a UPF node.

The RAN N3 tunnel information is used by the UPF node to correctly send data of the terminal device to a corresponding access network node. For a process of performing step 5048, refer to the prior art. Details are not described herein.

Optionally, the solution shown in FIG. 5A may further include: The terminal device sends some additional information to the AMF node. The additional information may include an identifier of the terminal device, or the identifier of the terminal device and location information of the terminal device. For example, the terminal device adds the additional information to an RRC request message, and sends the RRC request message to the access network node. After receiving the additional information sent by the terminal device, the access network node adds the additional information to the N2 interface signaling message, and sends the N2 interface signaling message to the AMF node. The process and step 501 may be performed simultaneously. In this case, step 501 may be replaced with the following: The terminal device sends, to the AMF node, a service request message and the identifier of the terminal device, or the service request message, the identifier of the terminal device, and the location information of the terminal device. Alternatively, the process may be performed before step 501, or may be performed after step 501 and before the AMF node sends indication information to the control plane node.

The identifier of the terminal device is used to identify the terminal device. The identifier of the terminal device may be an international mobile subscriber identity (IMSI), or may be an identifier specified in a communications protocol. The identifier may correspond to the IMSI. For example, when the terminal device communicates with the AMF node, an identifier that can be known by the terminal device and the AMF node is specified in advance in the communications protocol. The identifier may be a number, a letter, or another identifier. For example, a number 1 may be used as the identifier corresponding to the IMSI of the terminal device, to identify a terminal device 1.

The location information of the terminal device is used to determine a location at which the terminal device is currently located, and may be a historical camping cell of the terminal device and camping duration of each cell, or may be a historical camping message of the terminal device and a quantity of cell handover times, or may be coordinate information of the terminal device.

Optionally, the indication information in the solution shown in FIG. 5 may include an identifier of the terminal device, so that the control plane node obtains an activation-related parameter of the terminal device based on the identifier of the terminal device, and determines a to-be-activated PDU session of the terminal device based on the activation-related parameter. For details, refer to manners 2 and 3 in step 604.

Alternatively, the indication information may include an identifier of the terminal device and an identifier of a PDU session that the terminal device requests to activate, so that the control plane node obtains an activation-related parameter of the terminal device based on the identifier of the terminal device, and determines a to-be-activated PDU session of the terminal device based on the activation-related parameter. For details, refer to manners 2 to 4 in step 604.

Alternatively, the indication information may include an identifier of the terminal device, location information of the terminal device, and an identifier of a PDU session that the terminal device requests to activate, so that the control plane node obtains an activation-related parameter of the terminal device based on the identifier of the terminal device, and determines a to-be-activated PDU session of the terminal device based on the activation-related parameter. For details, refer to manners 1 to 4 in step 604.

Alternatively, the indication information may include an identifier of the terminal device and location information of the terminal device, so that the control plane node obtains an activation-related parameter of the terminal device based on the identifier of the terminal device, and determines a to-be-activated PDU session of the terminal device based on the activation-related parameter. For details, refer to manners 1 to 3 in step 604.

Alternatively, the indication information may include an identifier of the terminal device and a data network name (DNN) of a PDU session that the terminal device requests to activate, so that the control plane node obtains an activation-related parameter of the terminal device based on the identifier of the terminal device, and determines a to-be-activated PDU session of the terminal device based on the activation-related parameter and the DNN of the PDU session. For details, refer to a manner 4 in step 604. The DNN is a name of a data network to which the PDU session is connected, and is used to identify the data network to which the PDU session is connected. For example, the AMF may determine, based on the identifier of the PDU session that the terminal device requests to activate, the DNN of the PDU session that the terminal device requests to activate. When the AMF performs step 502, the AMF may send, to the control plane node, the DNN of the PDU session that the terminal device requests to activate, for example, add the DNN to the indication information, and send the indication information to the control plane node. That the AMF determines, based on the identifier of the PDU session that the terminal device requests to activate, the DNN of the PDU session that the terminal device requests to activate may include: The AMF determines, based on the identifier of the PDU session and a correspondence between the identifier of the PDU session and the DNN, the DNN of the PDU session that the terminal device requests to activate.

Alternatively, the indication information may include an identifier of the terminal device and network slice selection assistance information (NSSAI) of a PDU session that the terminal device requests to activate, so that the control plane node obtains an activation-related parameter of the terminal device based on the identifier of the terminal device, and determines a to-be-activated PDU session of the terminal device based on the activation-related parameter and the NSSAI of the PDU session. For details, refer to a manner 4 in step 604. The NSSAI of the PDU session is used to indicate a network slice in which an SMF managing the PDU session is located. The NSSAI includes a plurality of pieces of single NSSAI (S-NSSAI), and the S-NSSAI includes a service/service type (SST) and a slice differentiator (SD). The SST includes standardized and operator-defined types. The SD is optional information for supplementing the SST, to distinguish between a plurality of network slices with a same SST. For example, the AMF may determine, based on the identifier of the PDU session that the terminal device requests to activate, the NSSAI of the PDU session that the terminal device requests to activate. When the AMF performs step 502, the AMF may send, to the control plane node, the NSSAI of the PDU session that the terminal device requests to activate, for example, add the NSSAI to indication information, and send the indication information to the control plane node. That the AMF determines, based on the identifier of the PDU session that the terminal device requests to activate, the NSSAI of the PDU session that the terminal device requests to activate may include: The AMF determines, based on the identifier of the PDU session that the terminal device requests to activate and a correspondence between the identifier of the PDU session and the NSSAI, the NSSAI of the PDU session that the terminal device requests to activate.

Alternatively, the indication information may include an identifier of the terminal device and a DNN and NSSAI that are of a PDU session that the terminal device requests to activate, so that the control plane node obtains an activation-related parameter of the terminal device based on the identifier of the terminal device, and determines a to-be-activated PDU session of the terminal device based on the activation-related parameter and the DNN and the NSSAI that are of the PDU session. For details, refer to a manner 4 in step 604. For example, the AMF may determine, based on the identifier of the PDU session that the terminal device requests to activate, the DNN and the NSSAI that are of the PDU session that the terminal device requests to activate. When the AMF performs step 502, the AMF may send, to the control plane node, the DNN and the NSSAI that are of the PDU session that the terminal device requests to activate, for example, add the DNN and the NSSAI to indication information, and send the indication information to the control plane node. That the AMF determines, based on the identifier of the PDU session that the terminal device requests to activate, the DNN and the NSSAI that are of the PDU session that the terminal device requests to activate may include: The AMF determines, based on the identifier of the PDU session that the terminal device requests to activate and a correspondence between the identifier of the PDU session and a combination of the NSSAI and the DNN, the NSSAI of the PDU session that the terminal device requests to activate.

It should be noted that the identifier of the PDU session that the terminal device requests to activate, the DNN of the PDU session that the terminal device requests to activate, the NSSAI of the PDU session that the terminal device requests to activate, or the DNN and the NSSAI that are of the PDU session that the terminal device requests to activate may be added to information other than the indication information and the information is sent to the control plane node. This is not limited.

Optionally, the control plane node sends an identifier of the to-be-activated PDU session to the SMF node based on the indication information in the following implementations:

In an implementation, the control plane node obtains the activation-related parameter of the terminal device based on the indication information, determines the to-be-activated PDU session of the terminal device based on the activation-related parameter, and sends the identifier of the determined to-be-activated PDU session to the SMF node.

The indication information may include the identifier of the terminal device, or the identifier of the terminal device and the identifier of the PDU session that the terminal device requests to activate, or the identifier of the terminal device, the location information of the terminal device, and the identifier of the PDU session that the terminal device requests to activate, or the identifier of the terminal device and the location information of the terminal device.

That the control plane node obtains the activation-related parameter of the terminal device based on the indication information may include: The control plane node queries a correspondence between the terminal device and the activation-related parameter, and determines, as the activation-related parameter of the terminal device, an activation-related parameter corresponding to the terminal device identified by the identifier of the terminal device.

The activation-related parameter is described in step 604, and the correspondence between the terminal device and the activation-related parameter is prestored in the control plane node. For example, the control plane node stores a correspondence between a terminal device 1 and an activation-related parameter 1, a correspondence between a terminal device 2 and an activation-related parameter 2, and a correspondence between a terminal device 3 and an activation-related parameter 3, and the indication information includes an identifier 1 of the terminal device. In this case, after receiving the indication information, the control plane node may query the correspondences to find the activation-related parameter 1 corresponding to the terminal device whose identifier is 1, and use the activation-related parameter 1 as an activation-related parameter of the terminal device 1.

In another implementation, the indication information is used as a trigger condition for sending the to-be-activated PDU session to the SMF node by the control plane node. For example, when receiving the indication information, the control plane node sends the identifier of the to-be-activated PDU session of the terminal device to the SMF node.

In still another implementation, the indication information includes the identifier of the terminal device and the identifier of the PDU session that the terminal device requests to activate. The control plane node identifies the terminal device by using the identifier that is of the terminal device and that is included in the indication information, uses, as the to-be-activated PDU session of the terminal device, a PDU session identified by the identifier of the PDU session that the terminal device requests to activate, and sends the identifier of the to-be-activated PDU session to the SMF node.

Optionally, to reduce power consumption of the control plane node and improve security of determining the to-be-activated PDU session of the terminal device by the control plane node, the method further includes: The control plane node enables a prediction function of the control plane node based on information related to the prediction function. When enabling the prediction function of the control plane node, the control plane node may determine the to-be-activated PDU session of the terminal device based on the activation-related parameter.

The information related to the prediction function may include at least one of the following information: a device type of the terminal device, a service type supported by the terminal device, subscription data of the terminal device, a request message reported by the terminal device, information indicating whether the SMF node supports the prediction function of the control plane node, and information indicating whether the AMF node supports the prediction function of the control plane node. The request message is used to request the control plane node to enable the prediction function of the control plane node.

Figure 6:
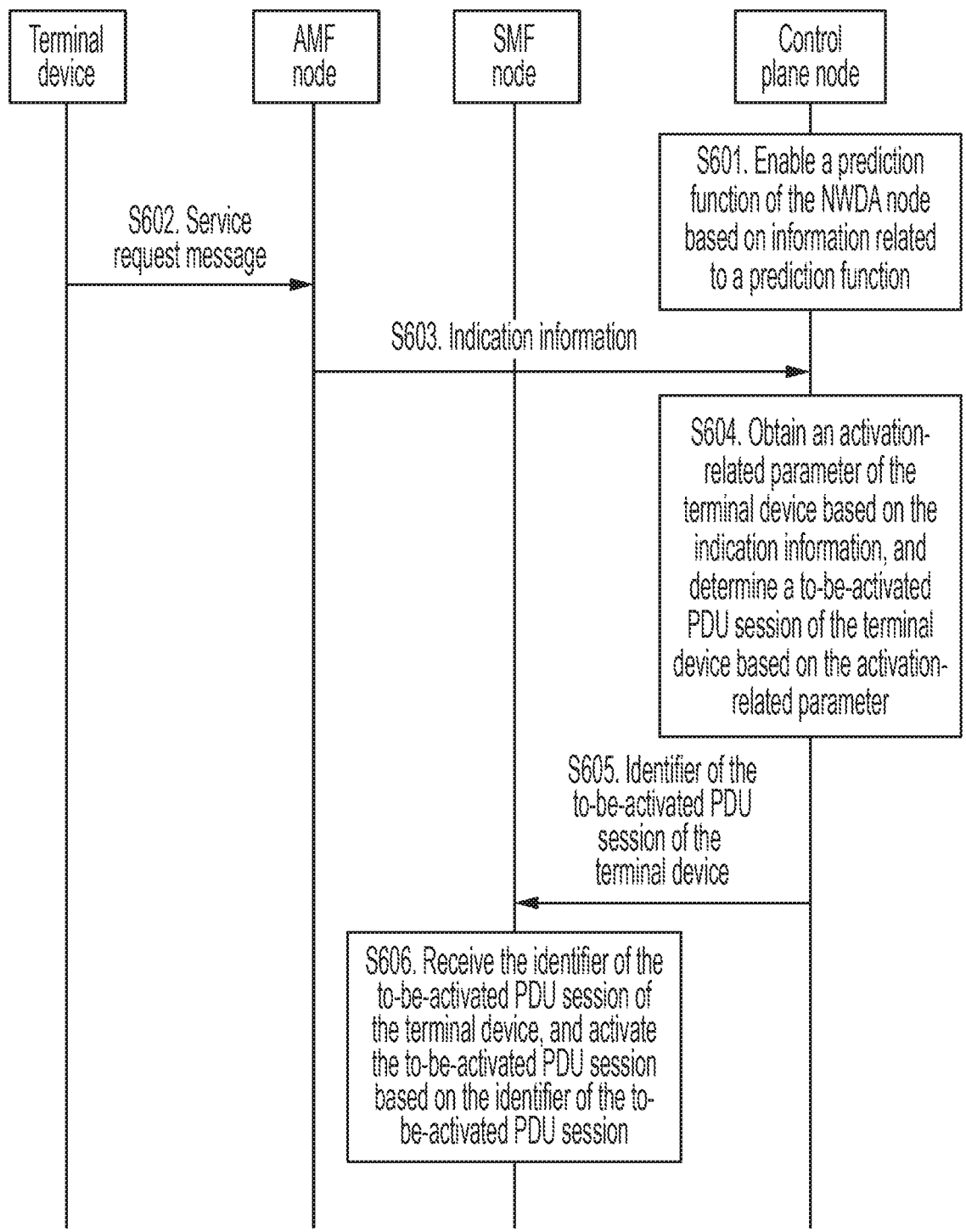
FIG. 6 is a flowchart of a session activation method according to an embodiment of the present disclosure.

Specifically, for the foregoing optional step, refer to related descriptions in FIG. 6. Details are not described.

FIG. 6 shows another session activation method according to an embodiment of the present disclosure. The method may include the following steps.

Step 601: A control plane node enables a prediction function of the control plane node based on information related to a first prediction function.

The prediction function of the control plane node is a function of determining a to-be-activated PDU session by the control plane node.

The information related to the first prediction function may include but is not limited to at least one of the following information: a device type of a terminal device, a service type supported by the terminal device, subscription data of the terminal device, a request message reported by the terminal device, information indicating whether an SMF node supports the prediction function of the control plane node, and information indicating whether an AMF node supports the prediction function of the control plane node.

The device type of the terminal device may be determined based on a service capability that can be provided by the terminal device. For example, a terminal device (for example, a sensor) in a machine-to-machine (M2M) type has only one PDU session. In this case, the control plane node may not perform prediction. A terminal device in a vehicle-to-everything (V2X) type has a relatively high delay requirement. In this case, the control plane node may enable the prediction function.

The service type supported by the terminal device may include types such as an image, a voice, and a video. For a service type (for example, a voice service) that has a relatively high delay requirement, the control plane node may enable the prediction function.

The subscription data of the terminal device may be data filled in when the terminal device performs network subscription, and the network subscription data is used to determine whether to predict the terminal device. For example, when the subscription data of the terminal device is used to instruct to predict the terminal device, the control plane node enables the prediction function based on the subscription data of the terminal device. When the network subscription data of the terminal device is used to instruct not to predict the terminal device, the control plane node disables the prediction function based on the subscription data of the terminal device.

The request message reported by the terminal device is used to request the control plane node to enable the prediction function. For example, when receiving the request message, the control plane node enables the prediction function of the control plane node.

The information indicating whether the SMF node supports the prediction function of the control plane node may be obtained by the control plane node from the SMF node. When the control plane node obtains information indicating that the SMF node supports the prediction function of the control plane node, the control plane node may enable the prediction function. When the control plane node obtains information indicating that the SMF node does not support the prediction function of the control plane node, the control plane node disables the prediction function.

The information indicating whether the AMF node supports the prediction function of the control plane node may be obtained by the control plane node from the AMF node. When the control plane node obtains information indicating that the AMF node supports the prediction function of the control plane node, the control plane node may enable the prediction function. When the control plane node obtains information indicating that the AMF node does not support the prediction function of the control plane node, the control plane node disables the prediction function.

It should be noted that step 601 is an optional step.

Step 602: The terminal device sends a service request message to the AMF node.

For step 602 and the service request message, refer to step 501. Details are not described herein again.

Step 603: The AMF node receives the service request message sent by the terminal device, and sends indication information to the control plane node based on the service request message.

For both step 603 and the indication information, refer to step 502. Details are not described herein again.

Step 604: The control plane node receives the indication information from the AMF node, obtains an activation-related parameter of the terminal device based on the indication information, and determines a to-be-activated PDU session of the terminal device based on the activation-related parameter.

A process in which the control plane node obtains the activation-related parameter of the terminal device based on the indication information is described above. Details are not described herein again.

That the control plane node determines the to-be-activated PDU session of the terminal device based on the activation-related parameter may include but is not limited to at least one of the following feasible implementations:

Manner 1: When the activation-related parameter of the terminal device includes a correspondence between a location area and a PDU session of the terminal device, the control plane node determines, as the to-be-activated PDU session based on the correspondence and location information of the terminal device, a PDU session that is of the terminal device and that corresponds to a location area in which the terminal device is currently located.

The PDU session that is of the terminal device and that corresponds to the location area in the correspondence includes a PDU session that has a relatively high activation frequency (for example, an activation frequency is greater than a preset threshold, that is, the PDU session is frequently activated) in the PDU session of the terminal device when the terminal device is located in the location area.

It should be noted that an activation status of the PDU session that is of the terminal device and that corresponds to the location area dynamically changes with an activation case of the PDU session. There may be a PDU session that is currently in an inactive state, or there may be a PDU session that is currently in an active state. When the location area in which the terminal device is currently located matches the location area, the PDU session in the inactive state may be used as the to-be-activated PDU session for activation. For example, a location area A corresponds to a PDU session 1, a PDU session 2, and a PDU session 3, the PDU session 2 is in an active state, and the PDU session 1 and the PDU session 3 are in an inactive state. When the terminal device is currently in the location area A, the PDU session 1 and the PDU session 3 may be determined as to-be-activated PDU sessions.

The location area may be an area in a network concept, for example, a cell, a TA, or a TAL; or may be a geographical location, for example, a Haidian district or a Chaoyang district; or may be an area at a finer granularity, for example, Zhongguancun in a Haidian district.

For example, the control plane node may obtain the location information of the terminal device from the received indication information, and identify, based on the location information, the location area in which the terminal device is currently located. The activation-related parameter may be obtained by the control plane node from the SMF node that manages the PDU session or from the AMF node, or may be determined by the control plane node based on mobility statistics data that is of the terminal device and that is obtained from the AMF node, and a correspondence between the activation-related parameter and the terminal device is prestored in the control plane node.

The mobility statistics data of the terminal device may include a probability that each PDU session of the terminal device is in an active state or a quantity of times that each PDU session is activated when the terminal device is in a location area.

Optionally, after obtaining the mobility statistics data of the terminal device, the control plane node may determine, as the PDU session that is of the terminal device and that corresponds to the location area, a PDU session whose probability is greater than a probability threshold or a PDU session whose quantity of times that the PDU session is activated is greater than a preset quantity of times, and store a correspondence between the PDU sessions.

The probability threshold and the preset quantity of times may be set based on a requirement.

For example, the mobility statistics data that is of the terminal device and that is obtained by the control plane node is as follows: When the terminal device is in the location area A, a probability that the PDU session 1 is in the active state is 90%, a probability that the PDU session 2 is in the active state is 40%, a probability that the PDU session 3 is in the active state is 60%, a probability that a PDU session 4 is in the active state is 70%, and a probability that a PDU session 5 is in the active state is 30%. If a PDU session whose probability is greater than or equal to 50% is determined as a PDU session corresponding to a location area, it may be determined, based on the mobility statistics data, that PDU sessions corresponding to the location area A are the PDU session 1, the PDU session 3, and the PDU session 4. In this case, if the control plane node identifies, by using the location information that is of the terminal device and that is included in the indication information, that the terminal device is currently located in the location area A, the control plane node may determine, based on the correspondence, that the PDU session 1, the PDU session 3, and the PDU session 4 are to-be-activated PDU sessions.

Manner 2: When the activation-related parameter of the terminal device includes an initial activation moment and an activation period that are of at least one PDU session of the terminal device, the control plane node determines an estimated activation moment of the at least one PDU session based on the initial activation moment and the activation period that are of the at least one PDU session, and determines, as the to-be-activated PDU session, a PDU session that is in the at least one PDU session and whose time difference between an estimated activation moment and a current moment is less than or equal to a first preset threshold.

The estimated activation moment of the PDU session is a moment that is after the current moment and that differs from a previous activation moment of the PDU session by one activation period, the previous activation moment of the PDU session is an activation moment that is before the current moment and that is adjacent to the current moment, and the activation moment is a moment at which the PDU session is activated.

In addition, the initial activation moment of the PDU session is a moment at which the PDU session is activated for the first time, and the activation period of the PDU session is a time interval between two adjacent activation moments of the PDU session.

It should be noted that the initial activation moment and the activation period that are of the PDU session and the first preset threshold may all be set based on a requirement. This is not limited in this embodiment of the present disclosure.

When the time difference between the estimated activation moment of the PDU session and the current moment is less than or equal to the first preset threshold, it indicates that the PDU session is to be activated in a short time after the current moment. For example, the PDU session is to be activated in a current service request procedure. When the time difference between the estimated activation moment of the PDU session and the current moment is greater than the first preset threshold, it indicates that the PDU session is not activated in a short time after the current moment. For example, the PDU session is not activated as the to-be-activated PDU session in a current service request procedure.

Optionally, the activation-related parameter in the manner 2 may be obtained by the control plane node from the SMF node that manages the PDU session, and a correspondence between the activation-related parameter and the terminal device is prestored in the control plane node.

For example, if an initial activation moment of a PDU session 1 is 9:00 a.m., an activation period of the PDU session 1 is one hour, an initial activation moment of a PDU session 2 is 7:00 a.m., an activation period of the PDU session 2 is two hours, a current moment is 11:30, and a first preset threshold is 30 minutes, an estimated activation moment that is of the PDU session 1 and that is closest to the current moment is 12:00, and a time difference between the estimated activation moment and the current moment is 30 minutes and is equal to the first preset threshold; and an estimated activation moment that is of the PDU session 2 and that is closest to the current moment is 13:00, and a time difference between the estimated activation moment and the current moment is 90 minutes and is greater than the first preset threshold. Therefore, the PDU session 1 may be determined as the to-be-activated PDU session.

Manner 3: When the activation-related parameter of the terminal device includes a fixed activation moment of at least one PDU session of the terminal device, the control plane node determines, as the to-be-activated PDU session, a PDU session that is in the at least one PDU session and whose time difference between a fixed activation moment and a current moment is less than or equal to a second preset threshold.

The fixed activation moment of the PDU session may mean that the PDU session is activated at each activation moment, and the fixed activation moment may be set based on a requirement. This is not limited in this embodiment of the present disclosure.

It may be understood that the fixed activation moment is a fixed activation moment after the current moment.

The second preset threshold may be set based on a requirement. This is not limited in this embodiment of the present disclosure. When the time difference between the fixed activation moment of the PDU session and the current moment is less than or equal to the second preset threshold, it indicates that the PDU session is to be activated in a short time after the current moment. For example, the PDU session is to be activated in a current service request procedure. When the time difference between the fixed activation moment of the PDU session and the current moment is greater than the second preset threshold, it indicates that the PDU session is not activated in a short time after the current moment. For example, the PDU session is not activated as the to-be-activated PDU session in a current service request procedure.

Optionally, the activation-related parameter in the manner 3 may be obtained by the control plane node from the SMF node that manages the PDU session, and a correspondence between the activation-related parameter and the terminal device is prestored in the control plane node.

For example, if a fixed activation moment of a PDU session 1 is 10:00 a.m., a fixed activation moment of a PDU session 2 is 11:00 a.m., a current moment is 9:30, and a second preset threshold is 30 minutes, a time difference between the fixed activation moment of the PDU session 1 and the current moment is 30 minutes and is equal to the second preset threshold; and a time difference between the fixed activation moment of the PDU session 2 and the current moment is 90 minutes and is greater than the second preset threshold. Therefore, the PDU session 1 may be determined as the to-be-activated PDU session.

Manner 4: When the activation-related parameter of the terminal device includes a correspondence between a PDU session of the terminal device and an associated PDU session, the control plane node determines, as the to-be-activated PDU session based on the correspondence and a PDU session that the terminal device requests to activate, an associated PDU session corresponding to the PDU session that the terminal device requests to activate.

In the correspondence in the manner 4, the associated PDU session corresponding to the PDU session of the terminal device may be a PDU session to be activated in a preset time after the PDU session of the terminal device is activated. The preset time may be set based on a requirement. This is not limited in this embodiment of the present disclosure.

In a possible design, the correspondence between the PDU session of the terminal device and the associated PDU session is a correspondence between an identifier of the PDU session of the terminal device and an identifier of the associated PDU session. The PDU session that the terminal device requests to activate may be indicated by an identifier of the PDU session that the terminal device requests to activate. For example, the indication information sent by the AMF to the control plane node carries the identifier of the PDU session that the terminal device requests to activate. That the control plane node determines, as the to-be-activated PDU session based on the correspondence and an identifier of a PDU session that the terminal device requests to activate, an associated PDU session of the PDU session that the terminal device requests to activate in the manner 4 may include: The control plane node determines, based on the correspondence between the identifier of the PDU session of the terminal device and the identifier of the associated PDU session of the PDU session of the terminal device, an identifier that is of the associated PDU session and that corresponds to the identifier of the PDU session that the terminal device requests to activate; and determines, as the to-be-activated PDU session, a PDU session identified by the determined identifier of the associated PDU session.

For example, assuming that an ID of a PDU session 1 is a PDU session ID 1, an ID of a PDU session 2 is a PDU session ID 2, and the PDU session 1 and the PDU session 2 are associated with each other, a correspondence between the PDU session 1 and the PDU session 2 is a correspondence between the PDU session ID 1 and the PDU session ID 2. After receiving the PDU session ID 1 that the terminal device requests to activate, the AMF sends the PDU session ID 1 to the control plane node. The control plane node determines the PDU session ID 2 as the to-be-activated PDU session based on the PDU session ID 1 and the correspondence between the PDU session ID 1 and the PDU session ID 2.

In another possible design, the correspondence between the PDU session of the terminal device and the associated PDU session is a correspondence between a DNN of the PDU session of the terminal device and a DNN of the associated PDU session. The PDU session that the terminal device requests to activate may be indicated by a DNN of the PDU session that the terminal device requests to activate. For example, the indication information sent by the AMF to the control plane node carries the DNN of the PDU session that the terminal device requests to activate. That the control plane node determines, as the to-be-activated PDU session based on the correspondence and information about a PDU session that the terminal device requests to activate, an associated PDU session of the PDU session that the terminal device requests to activate in the manner 4 may include: The control plane node determines, based on the correspondence between the DNN of the PDU session of the terminal device and the DNN of the associated PDU session of the PDU session of the terminal device, a DNN that is of the associated PDU session and that corresponds to the DNN of the PDU session that the terminal device requests to activate; and determines, as the to-be-activated PDU session, a PDU session corresponding to the determined DNN of the associated PDU session. In this design, the control plane node stores a correspondence between a DNN and a PDU session.

For example, assuming that a DNN corresponding to a PDU session 1 is a DNN 1, a DNN corresponding to a PDU session 2 is a DNN 2, and the PDU session 1 and the PDU session 2 are associated with each other, a correspondence between the PDU session 1 and the PDU session 2 is a correspondence between the DNN 1 and the DNN 2. After receiving a PDU session ID 1 that the terminal device requests to activate, the AMF determines the DNN of the PDU session ID 1 as the DNN 1, and sends the DNN 1 to the control plane node. The control plane node determines a PDU session ID 2 as the to-be-activated PDU session based on the DNN 1, the correspondence between the DNN 1 and the DNN 2, and a correspondence between the PDU session ID 2 and the DNN 2.

In still another possible design, the correspondence between the PDU session of the terminal device and the associated PDU session is a correspondence between NSSAI of the PDU session of the terminal device and NSSAI of the associated PDU session. The PDU session that the terminal device requests to activate may be indicated by NSSAI of the PDU session that the terminal device requests to activate. For example, the indication information sent by the AMF to the control plane node carries the NSSAI of the PDU session that the terminal device requests to activate. That the control plane node determines, as the to-be-activated PDU session based on the correspondence and information about a PDU session that the terminal device requests to activate, an associated PDU session of the PDU session that the terminal device requests to activate in the manner 4 may include: The control plane node determines, based on the correspondence between the NSSAI of the PDU session of the terminal device and the NSSAI of the associated PDU session of the PDU session of the terminal device, NSSAI that is of the associated PDU session and that corresponds to the NSSAI of the PDU session that the terminal device requests to activate; and determines, as the to-be-activated PDU session, a PDU session corresponding to the determined NASSI of the associated PDU session. In this design, the control plane node stores a correspondence between NASSI and a PDU session.

For example, assuming that NSSAI corresponding to a PDU session 1 is NSSAI 1, NSSAI corresponding to a PDU session 2 is NSSAI 2, and the PDU session 1 and the PDU session 2 are associated with each other, a correspondence between the PDU session 1 and the PDU session 2 is a correspondence between the NSSAI 1 and the NSSAI 2. The AMF receives a PDU session ID 1 that the terminal device requests to activate, determines the NSSAI 1 corresponding to the PDU session ID 1, and sends the NSSAI 1 to the control plane node. The control plane node determines a PDU session ID 2 as the to-be-activated PDU session based on the NSSAI 1, the correspondence between the NSSAI 1 and the NSSAI 2, and a correspondence between the PDU session ID 2 and the NSSAI 2.

In yet another possible design, the correspondence between the PDU session of the terminal device and the associated PDU session is a correspondence between a combination of a DNN and NSSAI that are of the PDU session of the terminal device and a combination of a DNN and NSSAI that are of the associated PDU session of the PDU session of the terminal device. The PDU session that the terminal device requests to activate may be indicated by a DNN and NSSAI that are of the PDU session that the terminal device requests to activate. For example, the indication information sent by the AMF to the control plane node carries the DNN and the NSSAI that are of the PDU session that the terminal device requests to activate. That the control plane node determines, as the to-be-activated PDU session based on the correspondence and information about a PDU session that the terminal device requests to activate, an associated PDU session of the PDU session that the terminal device requests to activate in the manner 4 may include: The control plane node determines, based on the correspondence, a DNN and NSSAI that are of the associated PDU session and that correspond to the DNN and the NSSAI that are of the PDU session that the terminal device requests to activate; and determines, as the to-be-activated PDU session, a PDU session corresponding to the determined DNN and NASSI that are of the associated PDU session. In this design, the control plane node stores a correspondence between a PDU session and a combination of a DNN and NASSI.

For example, assuming that (NSSAI and a DNN) corresponding to a PDU session 1 are (NSSAI 1 and a DNN 1), (NSSAI and a DNN) corresponding to a PDU session 2 are (NSSAI 2 and a DNN 2), and the PDU session 1 and the PDU session 2 are associated with each other, a correspondence between the PDU session 1 and the PDU session 2 is a correspondence between (the NSSAI 1 and the DNN 1) and (the NSSAI 2 and the DNN 2). After receiving a PDU session ID 1 that the terminal device requests to activate, and determining the NSSAI 1 and the DNN 1 that correspond to the PDU session ID 1, the AMF sends (the NSSAI 1 and the DNN 1) to the control plane node. The control plane node determines a PDU session ID 2 as the to-be-activated PDU session based on (the NSSAI 1 and the DNN 1), the correspondence between (the NSSAI 1 and the DNN 1) and (the NSSAI 2 and the DNN 2), and a correspondence between the PDU session ID 2 and (the NSSAI 2 and the DNN 2).

It should be noted that in a process of implementing the manner 4, the service request message in step 602 includes an identifier of the PDU session that the terminal device requests to activate. In step 603, the indication information sent by the AMF node to the control plane node further includes the identifier of the PDU session that the terminal device requests to activate. In the embodiments of this application, in addition to the identifier of the PDU session that the terminal device requests to activate, the DNN of the PDU session that the terminal device requests to activate, the NSSAI of the PDU session that the terminal device requests to activate, or the DNN and the NSSAI that are of the PDU session that the terminal device requests to activate may be used to identify the PDU session that the terminal device requests to activate. Therefore, the identifier that is sent by the AMF node to the control plane node and that is of the PDU session that the terminal device requests to activate may be replaced with the DNN of the PDU session that the terminal device requests to activate, the NSSAI of the PDU session that the terminal device requests to activate, or the DNN and the NSSAI that are of the PDU session that the terminal device requests to activate. This is not limited.

Optionally, the activation-related parameter in the manner 4 may be obtained by the control plane node from the SMF that manages the PDU session of the terminal device or from the AMF node, and a correspondence between the activation-related parameter and the terminal device is prestored in the control plane node.

For example, associated PDU sessions of the PDU session 1 of the terminal device are the PDU session 2 and the PDU session 3. In this case, when the PDU session that the terminal device requests to activate is the PDU session 1, the PDU session 2 and the PDU session 3 are determined as to-be-activated PDU sessions.

Step 605: The control plane node sends an identifier of the to-be-activated PDU session of the terminal device to the SMF node.

For a process of performing step 605, refer to related descriptions in step 503. Details are not described herein again.

Step 606: The SMF node receives the identifier of the to-be-activated PDU session of the terminal device, and activates the to-be-activated PDU session based on the identifier of the to-be-activated PDU session.

For a process of performing step 606, refer to related descriptions in step 504. Details are not described herein again.

It should be noted that in a process of implementing the solution shown in FIG. 6, step 601 may be performed in any step before step 604, and is not limited to the execution sequence shown in FIG. 6.

In the solutions shown in FIG. 5A and FIG. 6, a manner in which the control plane node sends the identifier of the to-be-activated PDU session of the terminal device to the SMF node may be as follows: The control plane node directly sends the identifier of the to-be-activated PDU session of the terminal device to the SMF node; or the control plane node sends the identifier of the to-be-activated PDU session of the terminal device to the SMF node by using the AMF node. For example, step 503 in the solution shown in FIG. 5A and step 605 in the solution shown in FIG. 6 may be replaced with the following: The control plane node sends the identifier of the to-be-activated PDU session of the terminal device to the AMF node. Step 504 and step 606 may be replaced with the following: The AMF node receives the identifier of the to-be-activated PDU session of the terminal device from the control plane node, and the AMF node sends the identifier of the to-be-activated PDU session of the terminal device to the SMF node; and the SMF node receives the identifier of the to-be-activated PDU session of the terminal device from the AMF node, and activates the to-be-activated PDU session based on the identifier of the to-be-activated PDU session.

It should be noted that when the solutions shown in FIG. 5A and FIG. 6 are performed, the AMF node may enable a prediction function of the AMF node based on some prediction-related parameters (for example, at least one of a device type of the terminal device, a service type supported by the terminal device, subscription data of the terminal device, a request message that is reported by the terminal device and that is used to request the AMF node to enable the prediction function of the AMF node, and information indicating whether the SMF node supports the prediction function of the AMF node). Therefore, when the AMF node enables the prediction function, and receives the service request message sent by the terminal device, the AMF node sends the indication information to the control plane node.

In another feasible solution, alternatively, after receiving the service request message sent by the terminal device, the AMF node may directly send the identifier of the to-be-activated PDU session of the terminal device to the SMF node, and the AMF node does not need to obtain the identifier of the to-be-activated PDU session through interaction with the control plane node or a PCF node, so that signaling overheads are reduced. Specifically, for a process of performing the feasible solution, refer to the solution shown in FIG. 7.

Figure 7:
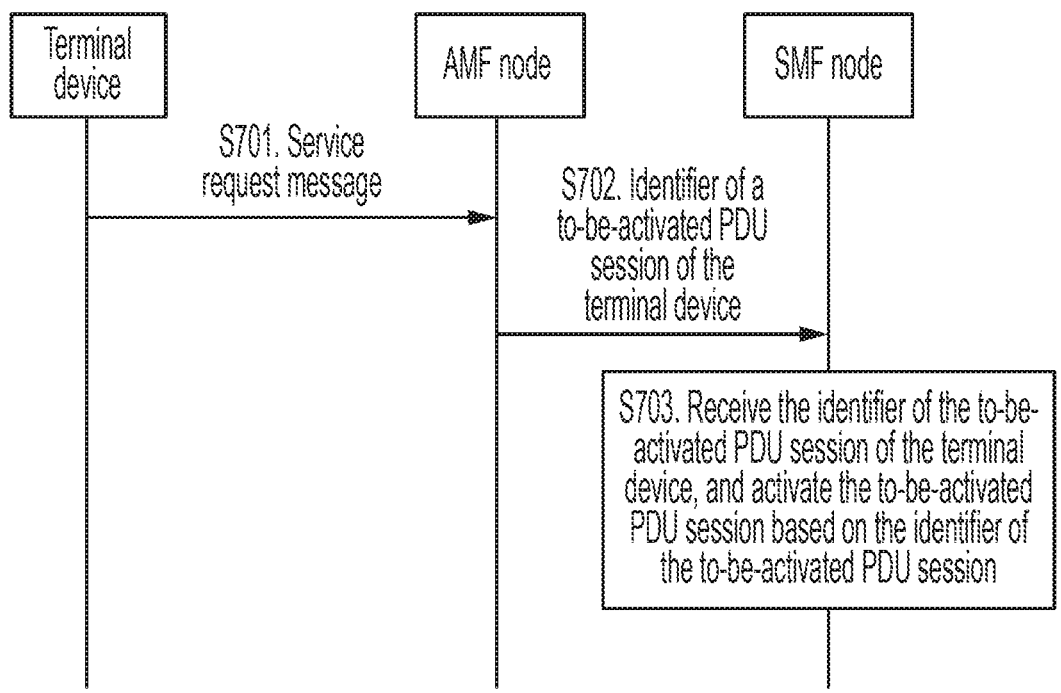
FIG. 7 is a flowchart of another session activation method according to an embodiment of the present disclosure.

FIG. 7 shows another PDU session activation method according to an embodiment of the present disclosure. The method may include the following steps.

Step 701: A terminal device sends a service request message to an AMF node.

For both a process of performing step 701 and the service request message, refer to step 501. Details are not described herein again.

Step 702: The AMF node receives the service request message sent by the terminal device, and sends an identifier of a to-be-activated PDU session of the terminal device to an SMF node based on the service request message.

The SMF node may be an SMF node that manages the to-be-activated PDU session.

Optionally, in a process of establishing a PDU session of the terminal device, a correspondence between the PDU session of the terminal device and an SMF node that manages the PDU session may be prestored in the AMF node. When performing step 702, the AMF node may find, based on the stored correspondence, the SMF node corresponding to the to-be-activated PDU session of the terminal device, and send the identifier of the to-be-activated PDU session to the SMF node.

For example, the AMF node may send the identifier of the to-be-activated PDU session to the SMF node based on the service request message in the following manners:

Manner 1: The AMF node obtains an activation-related parameter of the terminal device based on the service request message, determines the to-be-activated PDU session of the terminal device based on the activation-related parameter, and sends the identifier of the determined to-be-activated PDU session to the SMF node.

That the AMF node obtains an activation-related parameter of the terminal device based on the service request message may include:

When the AMF node receives the service request message sent by the terminal device, the AMF node sends an identifier of the terminal device to the control plane node, and receives the activation-related parameter that is of the terminal device and that is sent by the control plane node. For a manner in which the control plane node obtains the activation-related parameter of the terminal device based on the identifier of the terminal device, refer to the foregoing description. Details are not described herein again.

It should be noted that in the prior art, a connection established between the AMF node and the terminal device corresponds to the terminal device. The terminal device sends a message or data to the AMF node by using the connection corresponding to the terminal device. After receiving the service request message sent by the terminal device, the AMF node can identify the terminal device that sends the service request message.

Manner 2: When the service request message is used as a trigger condition for sending the identifier of the to-be-activated PDU session by the AMF node, and the AMF node receives the service request message, the AMF node sends the identifier of the to-be-activated PDU session to the SMF node.

It should be noted that the AMF node may identify, in the prior art, that a message received from the terminal device is a service request message. Details are not described herein.

Manner 3: When the service request message includes an identifier of a PDU session that the terminal device requests to activate, the AMF node obtains, from the service request message, the identifier of the PDU session that the terminal device requests to activate, uses, as the to-be-activated PDU session, the PDU session that the terminal device requests to activate, and sends the identifier of the to-be-activated PDU session to the SMF node.

Optionally, that the AMF node sends the identifier of the to-be-activated PDU session to the SMF node includes:

The AMF node sends an activation request message to the SMF node. The activation request message includes the identifier of the to-be-activated PDU session of the terminal device, and the activation request message is used to request to activate the to-be-activated PDU session of the terminal device.

Step 703: The SMF node receives the identifier of the to-be-activated PDU session of the terminal device, and activates the to-be-activated PDU session based on the identifier of the to-be-activated PDU session.

For a process of performing step 703, refer to step 504. Details are not described herein again.

Compared with the prior art, in the technical solution shown in FIG. 7, when the terminal device sends the service request message to the AMF node, in other words, when the terminal device initiates a service request procedure once, the AMF node sends the identifier of the to-be-activated PDU session to the SMF node to activate a PDU session that may be activated in the future. That is, the terminal device initiates the service request procedure once to activate a future to-be-activated PDU session. This is unnecessarily the same as the prior art in which the PDU session is activated only when data corresponding to the PDU session needs to be sent, and consequently the terminal device initiates a plurality of times of PDU session activation procedures. In the technical solution provided in this embodiment of the present disclosure, a quantity of times of initiating a PDU session activation procedure by the terminal device is reduced, and signaling overheads are reduced.

Optionally, to reduce power consumption of the AMF node and improve security of determining the to-be-activated PDU session of the terminal device by the AMF node, the method further includes: The AMF node enables a prediction function of the AMF node based on information related to the prediction function. When starting the prediction function of the AMF node, the AMF node may determine the to-be-activated PDU session of the terminal device based on the activation-related parameter.

Figure 8:
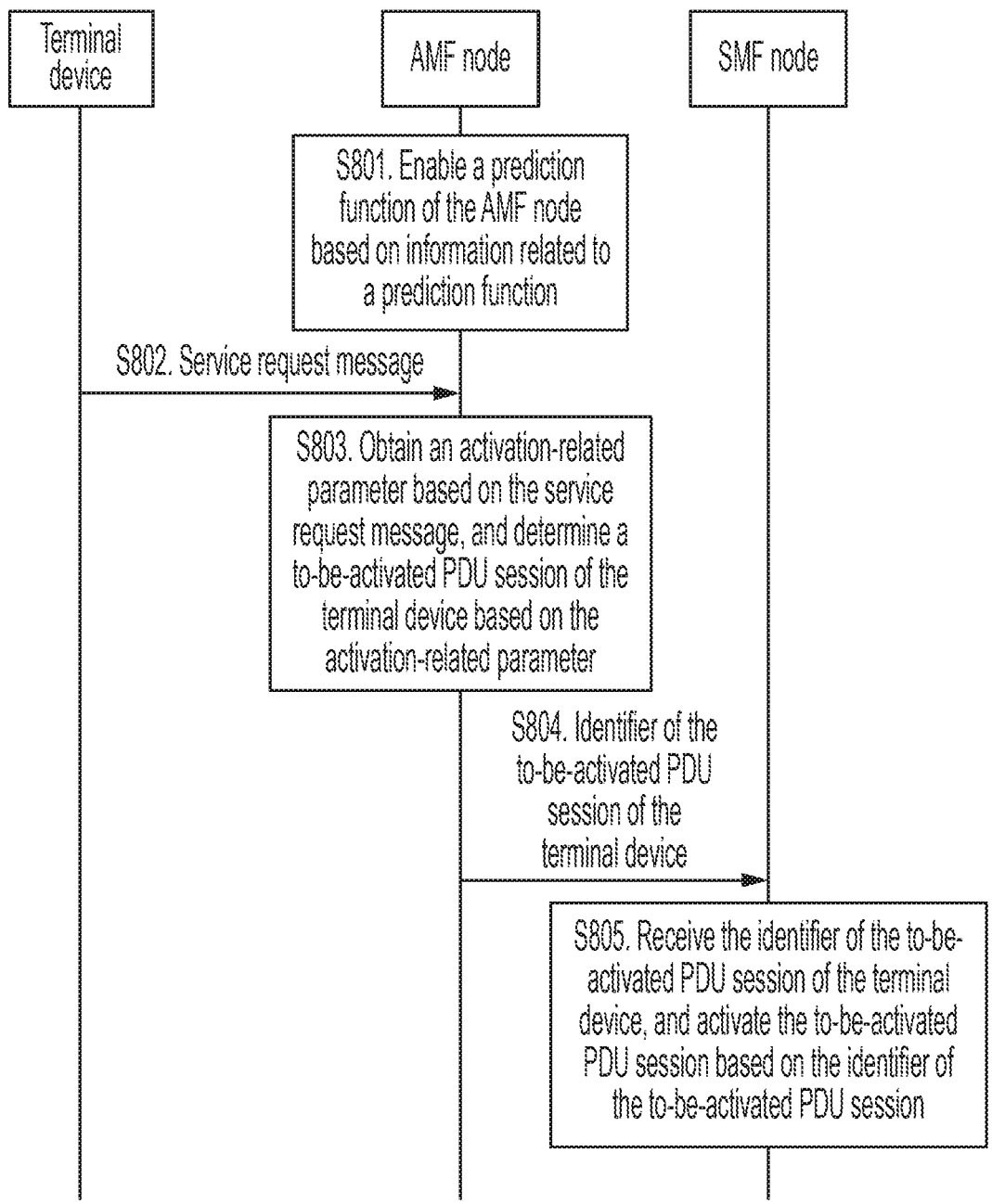
FIG. 8 is a flowchart of another session activation method according to an embodiment of the present disclosure.

Specifically, for the foregoing optional step, refer to related descriptions in FIG. 8. Details are not described.

FIG. 8 shows still another session activation method according to an embodiment of the present disclosure. The method may include the following steps.

Step 801: An AMF node enables a prediction function of the AMF node based on information related to a second prediction function.

The information related to the second prediction function in step 801 may include but is not limited to at least one of the following information: a device type of a terminal device, a service type supported by the terminal device, subscription data of the terminal device, a request message reported by the terminal device, and information indicating whether an SMF node supports the prediction function of the AMF node. The request message is used to request the AMF node to enable the predication function of the AMF node.

It should be noted that step 801 is an optional step. For the foregoing mentioned parameters and a process of performing step 801, refer to related descriptions in the embodiment shown in FIG. 6. Details are not described again.

Step 802: The terminal device sends a service request message to the AMF node.

For a process of performing step 802 and the service request message, refer to related descriptions in step 501. Details are not described herein again.

Step 803: The AMF node receives the service request message sent by the terminal device, obtains an activation-related parameter based on the service request message, and determines a to-be-activated PDU session of the terminal device based on the activation-related parameter.

A manner in which the AMF node obtains the activation-related parameter based on the service request message is described in step 702. Details are not described herein again.

That the AMF node determines a to-be-activated PDU session of the terminal device based on the activation-related parameter may include:

The AMF node determines the to-be-activated PDU session of the terminal device with reference to the manners 2 and 3 in step 604. Details are not described herein again.

Alternatively, when the service request message includes a PDU session that the terminal device requests to activate, the AMF node determines the to-be-activated PDU session of the terminal device with reference to the manners 2 to 4 in step 604. Details are not described herein again.

Alternatively, when the service request message includes a PDU session that the terminal device requests to activate, the solution shown in FIG. 8 further includes: The terminal device sends location information of the terminal device to the AMF node; and the AMF node receives the location information that is of the terminal device and that is sent by the terminal device, and the AMF node determines the to-be-activated PDU session of the terminal device with reference to the manners 1 to 4 in step 604. Details are not described herein again.

Alternatively, the solution shown in FIG. 8 further includes: The terminal device sends location information of the terminal device to the AMF node; and the AMF node receives the location information that is of the terminal device and that is sent by the terminal device, and the AMF node determines the to-be-activated PDU session of the terminal device with reference to the manners 1 to 3 in step 604. Details are not described herein again.

Step 804: The AMF node sends an identifier of the to-be-activated PDU session of the terminal device to the SMF node.

For a process of performing step 804, refer to step 702. Details are not described herein again.

Step 805: The SMF node receives the identifier of the to-be-activated PDU session of the terminal device, and activates the to-be-activated PDU session based on the identifier of the to-be-activated PDU session.

For a process of performing step 805, refer to step 504. Details are not described herein again.

Therefore, the AMF node determines the to-be-activated PDU session of the terminal device, and sends the identifier of the to-be-activated PDU session to the SMF node, to activate the to-be-activated PDU session. The AMF node does not need to notify an NWDA node or a PCF node of indication information indicating that the AMF node receives the service request message, and the NWDA node or the PCF node determines the to-be-activated PDU session of the terminal device. This reduces an interaction procedure between nodes, and reduces signaling overheads.

In still another feasible solution, alternatively, the terminal device may directly determine the to-be-activated PDU session of the terminal device, and send the identifier of the to-be-activated PDU session to the SMF node by using the AMF node, to activate the PDU session. Specifically, for a process of performing the feasible solution, refer to a solution shown in FIG. 9.

Figure 9:
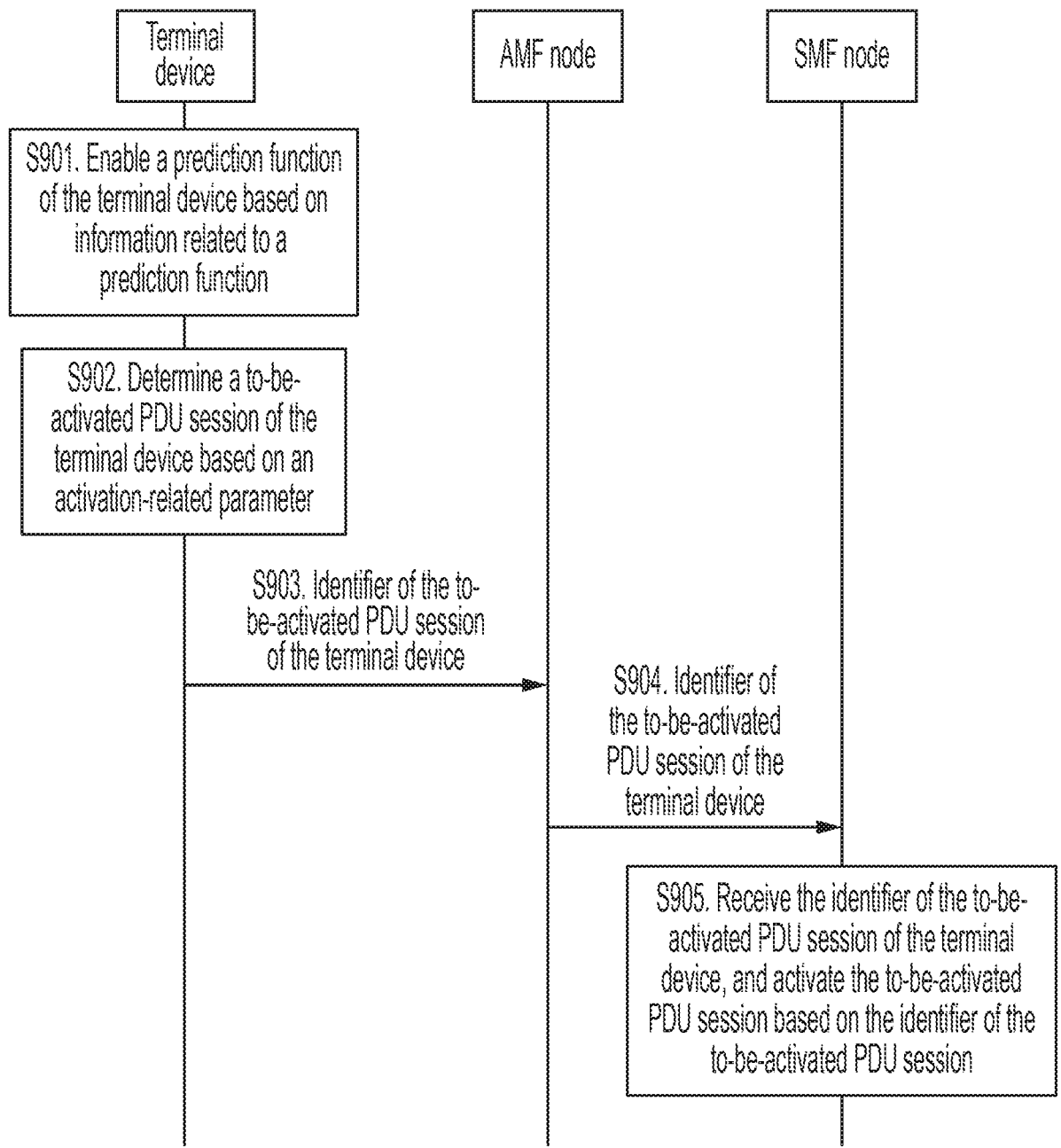
FIG. 9 is a flowchart of still another session activation method according to an embodiment of the present disclosure.

FIG. 9 shows still another session activation method according to an embodiment of the present disclosure. The method includes the following steps.

Step 901: A terminal device enables a prediction function of the terminal device based on a parameter related to a third prediction function.

The parameter related to the third prediction function in step 901 may include but is not limited to at least one of the following information: a device type of the terminal device, a service type supported by the terminal device, subscription data of the terminal device, and a request message reported by the terminal device.

It should be noted that step 901 is an optional step. For the foregoing mentioned parameters and a process of performing step 901, refer to related descriptions in the embodiment shown in FIG. 6. Details are not described again.

Step 902: The terminal device determines a to-be-activated PDU session of the terminal device based on an activation-related parameter.

For the activation-related parameter in step 902, refer to the foregoing embodiment. The activation-related parameter may be obtained from a network entity function node in a registration procedure or a terminal device configuration update procedure. The network entity function node may be an AMF node, an NWDA node, or a PCF node.

For a process of performing the registration procedure or the terminal device configuration update procedure, refer to the prior art. Details are not described herein.

Optionally, when the terminal device requests to activate a PDU session, for a process in which the terminal device determines the to-be-activated PDU session of the terminal device based on the activation-related parameter in step 902, reference may be made to a process in which the control plane node determines the to-be-activated PDU session of the terminal device based on the activation-related parameter in step 604, for example, the manners 1 to 4. Details are not described herein again.

Alternatively, for a process in which the terminal device determines the to-be-activated PDU session of the terminal device based on the activation-related parameter in step 902, refer to a process in which the control plane node determines the to-be-activated PDU session of the terminal device based on the activation-related parameter in step 604, for example, the manners 1 to 3. Details are not described herein again.

Step 903: The terminal device sends an identifier of the to-be-activated PDU session of the terminal device to the AMF node.

Optionally, the terminal device may send a service request message to the AMF node. The service request message is used to request to activate a PDU session of the terminal device, and the service request message includes an identifier of the PDU session that the terminal device requests to activate and the identifier of the to-be-activated PDU session of the terminal device. Alternatively, the service request message is used to request to switch the terminal device from an idle state to a connected state, and to request to activate a PDU session of the terminal device, and the service request message includes an identifier of the PDU session that the terminal device requests to activate and the identifier of the to-be-activated PDU session of the terminal device.

Step 904: The AMF node receives the identifier that is of the to-be-activated PDU session of the terminal device and that is sent by the terminal device, and sends the identifier of the to-be-activated PDU session of the terminal device to an SMF node.

Step 905: The SMF node receives the identifier of the to-be-activated PDU session of the terminal device from the AMF node, and activates the to-be-activated PDU session of the terminal device.

For a process of performing step 905, refer to step 504. Details are not described herein again.

It should be noted that when the solution shown in FIG. 9 is performed, the AMF node may enable a prediction function of the AMF node based on some prediction-related parameters (for example, at least one of a device type of the terminal device, a service type supported by the terminal device, subscription data of the terminal device, a request message that is reported by the terminal device and that is used to request the AMF node to enable the prediction function of the AMF node, and information indicating whether the SMF node supports the prediction function of the AMF node). Therefore, when the AMF node enables the prediction function, and receives the identifier that is of the PDU session and that is sent by the terminal device, the AMF node sends the identifier of the PDU session to the SMF node.

Compared with the prior art, in the technical solution shown in FIG. 9, when the terminal device sends the service request message to the AMF node, in other words, when the terminal device initiates a service request procedure once, the terminal device determines the to-be-activated PDU session of the terminal device, and sends the identifier of the to-be-activated PDU session to the SMF node, to activate a PDU session that may be activated in the future. That is, the terminal device initiates the service request procedure once to activate a future to-be-activated PDU session. This is unnecessarily the same as the prior art in which the PDU session is activated only when data corresponding to the PDU session needs to be sent, and consequently the terminal device initiates a plurality of times of PDU session activation procedures. In the technical solution provided in this embodiment of the present disclosure, a quantity of times of initiating a PDU session activation procedure by the terminal device is reduced, and signaling overheads are reduced.

In yet another feasible solution, alternatively, the SMF node may determine the to-be-activated PDU session of the terminal device, and activate the to-be-activated PDU session. Optionally, for a process of performing the solution, refer to a solution shown in FIG. 10.

Figure 10:
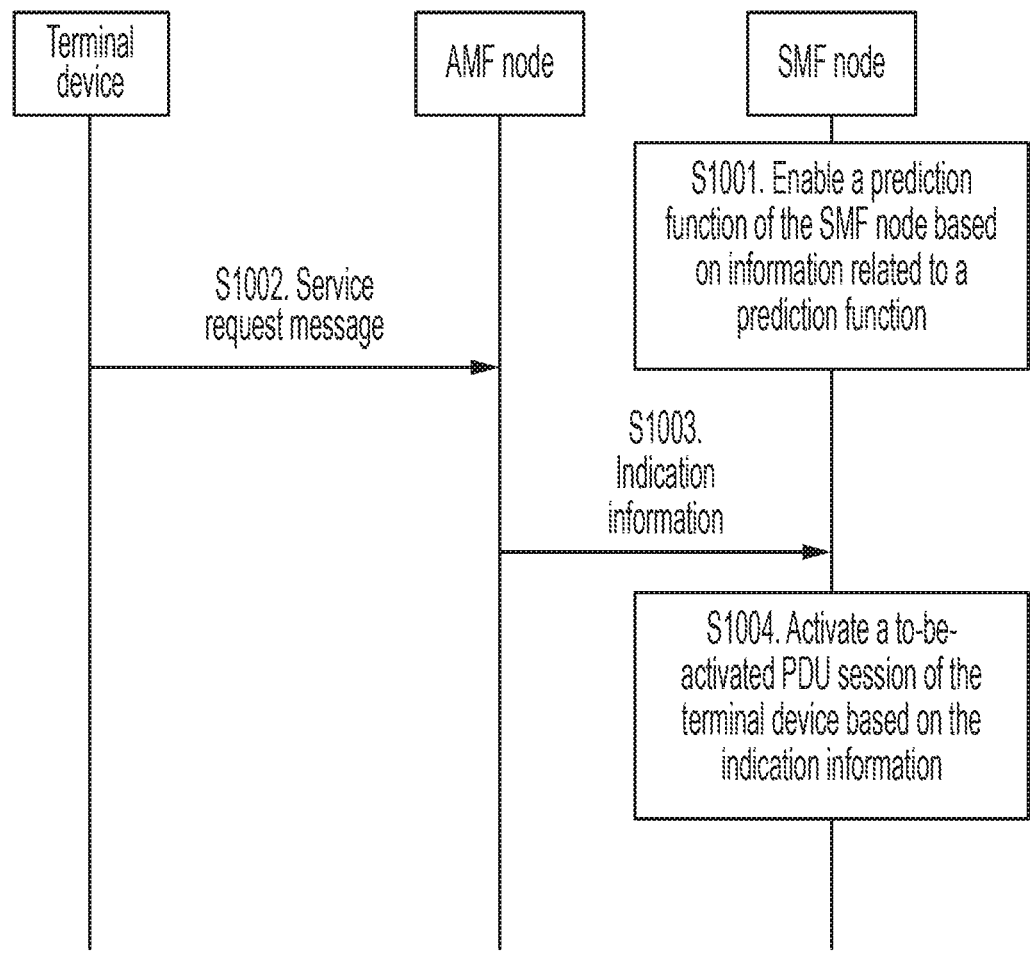
FIG. 10 is a flowchart of still another session activation method according to an embodiment of the present disclosure.

FIG. 10 shows still another session activation method according to an embodiment of the present disclosure. The method includes the following steps.

Step 1001: An SMF node enables a prediction function of the SMF node based on a parameter related to a fourth prediction function.

The parameter related to the fourth prediction function in step 1001 may include but is not limited to at least one of the following information: a device type of a terminal device, a service type supported by the terminal device, subscription data of the terminal device, a request message that is reported by the terminal device and that is used to request to enable the prediction function of the SMF node, and information indicating whether the SMF node supports the prediction function of the SMF node.

It should be noted that step 1001 is an optional step. For the foregoing mentioned parameters and a process of performing step 1001, refer to related descriptions in the embodiment shown in FIG. 6. Details are not described again.

Step 1002: The terminal device sends a service request message to an AMF node.

For both step 1002 and the service request message, refer to related descriptions in step 501. Details are not described herein again.

Step 1003: The AMF node receives the service request message sent by the terminal device, and sends indication information to the SMF node based on the service request message.

The indication information is described in the solution in FIG. 5A. Details are not described herein again. The indication information is used to indicate that the AMF node receives the service request message sent by the terminal device.

The indication information may include an identifier of the terminal device, so that the SMF node identifies the terminal device based on the identifier of the terminal device, and determines a to-be-activated PDU session of the terminal device in the manners 1 to 3 in step 604.

Alternatively, the indication information may include an identifier of the terminal device and an identifier of a PDU session that the terminal device requests to activate, so that the SMF node identifies the terminal device based on the identifier of the terminal device, and determines a to-be-activated PDU session of the terminal device in the manners 1 to 4 in step 604.

For example, the AMF node may send the indication information to the SMF node based on the service request message in the following manners:

Manner 1: When determining, based on the service request message, that the terminal device needs to switch from an idle state to a connected state, the AMF node sends the indication information to the SMF node.

Manner 2: When the service request message is used as a trigger condition for sending the indication information by the AMF node, for example, the AMF node receives the service request message, the AMF node sends the indication information to the SMF node.

Manner 3: When the service request message includes the identifier of the PDU session that the terminal device requests to activate, and the AMF node determines, based on the service request message, that the terminal device needs to switch from an idle state to a connected state, the AMF node sends the indication information to the SMF node.

That the AMF node sends the indication information to the SMF node may include: sending the indication information to the SMF node by using, as the indication information or a part of the indication information, the identifier of the PDU session that the terminal device requests to activate.

Manner 4: When the service request message includes the identifier of the PDU session that the terminal device requests to activate, the AMF node sends the indication information to the SMF node.

That the AMF node sends the indication information to the SMF node may include: sending the indication information to the SMF node by using, as the indication information or a part of the indication information, the PDU session that the terminal device requests to activate.

In the foregoing four manners, for a manner in which the AMF node identifies that a received message sent by the terminal device is the service request message, and the terminal device switches from the idle state to the connected state, refer to descriptions in step 502. Details are not described herein again.

Optionally, that the AMF node sends the indication information to the SMF node may be specifically as follows:

The AMF sends the indication information to all SMF nodes in a network in which the AMF node is located.

Alternatively, the AMF node sends the indication information to SMF nodes corresponding to all PDU sessions that currently have no data transmission service. For example, the AMF node may send the indication information to all SMF nodes except an SMF node corresponding to the PDU session that the terminal device requests to activate.

Alternatively, the AMF node sends the indication information to SMF nodes corresponding to some PDU sessions that currently have no data transmission requirement. For example, the AMF node may send the indication information to some SMF nodes other than an SMF node corresponding to the PDU session that the terminal device requests to activate.

A correspondence between the PDU session of the terminal device and the SMF node is prestored in the AMF node.

Step 1004: The SMF node receives the indication information from the AMF node, and activates the to-be-activated PDU session of the terminal device based on the indication information.

For a process in which the SMF node activates the to-be-activated PDU session in step 1004, refer to the solution shown in FIG. 5B. Details are not described herein again.

For example, the SMF node may activate the to-be-activated PDU session of the terminal device based on the indication information in the following manners:

Manner 1: The SMF node obtains an activation-related parameter of the terminal device based on the indication information, determines the to-be-activated PDU session of the terminal device based on the activation-related parameter, and activates the determined to-be-activated PDU session.

When the indication information includes the identifier of the terminal device, that the SMF node obtains an activation-related parameter of the terminal device based on the indication information, and determines the to-be-activated PDU session of the terminal device based on the activation-related parameter may include: The SMF node sends the identifier of the terminal device to a control plane node, receives the activation-related parameter that is of the terminal device and that is obtained by the control plane node based on the identifier of the terminal device, and determines the to-be-activated PDU session of the terminal device in the manners 2 and 3 in step 604.

When the indication information includes the identifier of the terminal device and the identifier of the PDU session that the terminal device requests to activate, that the SMF node obtains an activation-related parameter of the terminal device based on the indication information, and determines the to-be-activated PDU session of the terminal device based on the activation-related parameter may include: The SMF node sends the identifier of the terminal device to a control plane node, receives the activation-related parameter that is of the terminal device and that is obtained by the control plane node based on the identifier of the terminal device, and determines the to-be-activated PDU session of the terminal device in the manners 2 to 4 in step 604.

When the indication information includes the identifier of the terminal device, location information of the terminal device, and the identifier of the PDU session that the terminal device requests to activate, that the SMF node obtains an activation-related parameter of the terminal device based on the indication information, and determines the to-be-activated PDU session of the terminal device based on the activation-related parameter may include: The SMF node sends the identifier of the terminal device to a control plane node, receives the activation-related parameter that is of the terminal device and that is obtained by the control plane node based on the identifier of the terminal device, and determines the to-be-activated PDU session of the terminal device in the manners 1 to 4 in step 604.

When the indication information includes the identifier of the terminal device and location information of the terminal device, that the SMF node obtains an activation-related parameter of the terminal device based on the indication information, and determines the to-be-activated PDU session of the terminal device based on the activation-related parameter may include: The SMF node sends the identifier of the terminal device to a control plane node, receives the activation-related parameter that is of the terminal device and that is obtained by the control plane node based on the identifier of the terminal device, and determines the to-be-activated PDU session of the terminal device in the manners 1 to 3 in step 604.

For a manner in which the control plane node obtains the activation-related parameter of the terminal device based on the identifier of the terminal device, refer to descriptions in the solution in FIG. 5A. Details are not described herein again.

Manner 2: When the indication information is used as a trigger condition for determining the to-be-activated PDU session of the terminal device by the SMF node, for example, the SMF node determines that the indication information is received, the SMF node determines the to-be-activated PDU session of the terminal device, and activates the determined to-be-activated PDU session.

Optionally, that the SMF node determines the to-be-activated PDU session of the terminal device includes: The SMF node determines, based on the activation-related parameter, to activate the to-be-activated PDU session of the terminal device.

The activation-related parameter may be obtained by the SMF node from an NWDA node or a PCF node in real time, or subscribed periodically. For a process in which the SMF node determines the to-be-activated PDU session of the terminal device based on the activation-related parameter, refer to step 604, for example, the manners 2 and 3. Details are not described herein again.

Manner 3: The SMF node obtains, from the indication information, the identifier of the PDU session that the terminal device requests to activate, uses, as the to-be-activated PDU session, the PDU session that the terminal device requests to activate, and activates the to-be-activated PDU session.

It should be noted that in a process of implementing the solution shown in FIG. 10, step 1001 may be performed in any step before step 1004, and is not limited to the execution sequence shown in FIG. 10.

Compared with the prior art, in the technical solution shown in FIG. 10, when the terminal device sends the service request message to the AMF node, in other words, when the terminal device initiates a service request procedure once, the SMF determines the to-be-activated PDU session of the terminal device, and activates the to-be-activated PDU session. That is, the terminal device initiates the service request procedure once to activate a PDU session that may be activated in the future. This is unnecessarily the same as the prior art in which the PDU session is activated only when data corresponding to the PDU session needs to be sent, and consequently the terminal device initiates a plurality of times of PDU session activation procedures. In the technical solution provided in this embodiment of the present disclosure, a quantity of times of initiating a PDU session activation procedure by the terminal device is reduced, and signaling overheads are reduced.

In addition, when the solution shown in FIG. 10 is performed, the AMF node may enable a prediction function of the AMF node based on some prediction-related parameters (for example, at least one of a device type of the terminal device, a service type supported by the terminal device, subscription data of the terminal device, a request message that is reported by the terminal device and that is used to request the AMF node to enable the prediction function of the AMF node, and information indicating whether the SMF node supports the prediction function of the AMF node). Therefore, when enabling the prediction function, the AMF node sends the indication information to the SMF node.

It should be noted that the foregoing method embodiments merely show a process of activating one to-be-activated PDU session. For a process of activating a plurality of to-be-activated PDU sessions, refer to the solutions provided in the foregoing method embodiments. Details are not described herein again.

The foregoing mainly describes the solutions provided in the embodiments of the present disclosure from a perspective of interaction between the nodes. It may be understood that to implement the foregoing functions, each node such as the control plane node (the NWDA node or the PCF node), the AMF node, the SMF node, or the terminal device includes a corresponding hardware structure and/or software module for performing each function. A person skilled in the art should be easily aware that algorithms steps in the examples described with reference to the embodiments disclosed in this specification can be implemented by hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments of the present disclosure, the control plane node (the NWDA node or the PCF node), the AMF node, the SMF node, and the terminal device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of the present disclosure is an example, and is merely logical function division. There may be another division manner in actual implementation.

Figure 11:
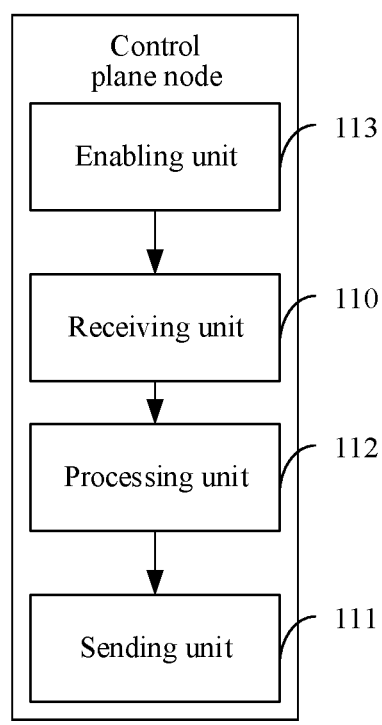
FIG. 11 is a schematic composition diagram of a control plane node according to an embodiment of the present disclosure.

When each function module is obtained through division based on each corresponding function, FIG. 11 is a possible schematic composition diagram of a control plane node. As shown in FIG. 11, the control plane node may be the NWDA node or the PCF node in the foregoing embodiments, and may include a receiving unit 110, a sending unit 111, a processing unit 112, and an enabling unit 113.

The receiving unit 110 is configured to support the control plane node in performing step 503 shown in FIG. 5A and step 603 in FIG. 6.

The sending unit 111 is configured to support the control plane node in performing step 503 in FIG. 5A and step 605 in FIG. 6.

The processing unit 112 is configured to support the control plane node in performing step 604 shown in FIG. 6.

The enabling unit 113 is configured to support the control plane node in performing step 601 shown in FIG. 6.

It should be noted that all related content of the steps in the foregoing method embodiments may be cited in function descriptions of corresponding function modules. Details are not described herein again. The control plane node provided in this embodiment of the present disclosure is configured to perform the foregoing session activation method, and therefore can achieve a same effect as the foregoing session activation method.

Figure 12:
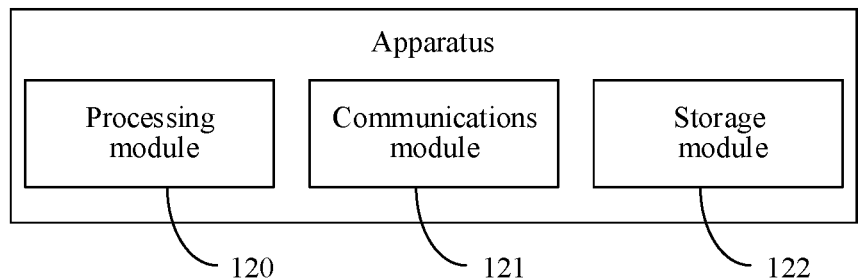
FIG. 12 is a schematic composition diagram of a control plane node according to an embodiment of the present disclosure.

When an integrated unit is used, FIG. 12 shows an apparatus. The apparatus exists in a form of a chip, and is configured to perform an action performed by the control plane node in the foregoing embodiment. As shown in FIG. 12, the apparatus may include a processing module 120 and a communications module 121.

The processing module 120 is configured to control and manage an action of the apparatus. For example, the processing module 120 is configured to support the apparatus in performing step 601 and step 604 in FIG. 6, and/or is configured to perform another process of the technology described in this specification. The communications module 121 is configured to support the apparatus in communicating with another network entity, for example, communicating with a function module or a network entity shown in FIG. 2. The apparatus may further include a storage module 122, configured to store program code and data.

The processing module 120 may be a processor or a controller. The processing module 120 may implement or execute various examples of logical blocks, modules, and circuits described with reference to content disclosed in the present disclosure. Alternatively, the processor may be a combination of processors implementing a computing function, for example, a combination of one or more microprocessors, a combination of a DSP and a microprocessor, or the like. The communications module 121 may be a transceiver, a transceiver circuit, a communications interface, or the like. The storage module 122 may be a memory.

When the processing module 120 is the processor, the communications module 121 is the communications interface, and the storage module 122 is the memory, the apparatus may be the control plane node shown in FIG. 3.

Figure 13:
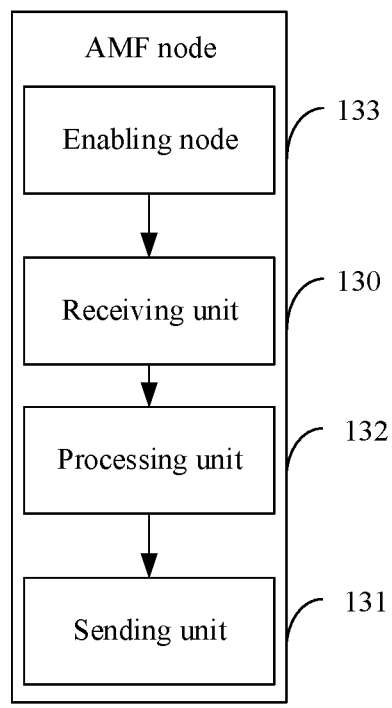
FIG. 13 is a schematic composition diagram of an AMF node according to an embodiment of the present disclosure.

When each function module is obtained through division based on each corresponding function, FIG. 13 is a possible schematic composition diagram of an AMF node. As shown in FIG. 13, the AMF node may include a receiving unit 130, a sending unit 131, a processing unit 132, and an enabling unit 133.

The receiving unit 130 is configured to support the AMF node in performing step 502, step 5042, step 5045, step 603, step 702, step 802, step 904, and step 1003.

The sending unit 131 is configured to support the AMF node in performing step 502, step 5052, step 5042, step 5045, step 603, step 702, step 804, step 904, and step 1003.

The processing unit 132 is configured to support the AMF node in performing step 803.

The enabling unit 133 is configured to support the AMF node in performing step 801.

It should be noted that all related content of the steps in the foregoing method embodiments may be cited in function descriptions of corresponding function modules. Details are not described herein again. The AMF node provided in this embodiment of the present disclosure is configured to perform the foregoing session activation method, and therefore can achieve a same effect as the foregoing session activation method.

Figure 14:
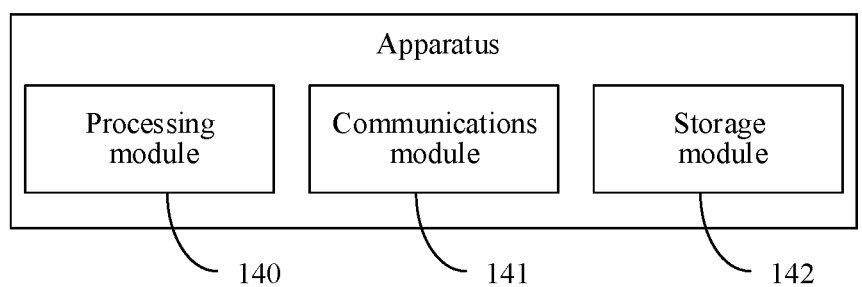
FIG. 14 is a schematic composition diagram of an AMF node according to an embodiment of the present disclosure.

When an integrated unit is used, FIG. 14 shows an apparatus. The apparatus exists in a form of a chip, and is configured to perform an action of the AMF node in the foregoing embodiment. As shown in FIG. 14, the apparatus may include a processing module 140 and a communications module 141.

The processing module 140 is configured to control and manage an action of the apparatus. For example, the processing module 140 is configured to support the apparatus in performing step 801 and step 803. The communications module 141 is configured to support the apparatus in communicating with another network entity, for example, communicating with a function module or a network entity shown in FIG. 2. The apparatus may further include a storage module 142, configured to store program code and data.

The processing module 140 may be a processor or a controller. The processing module 140 may implement or execute various examples of logical blocks, modules, and circuits described with reference to content disclosed in the present disclosure. Alternatively, the processor may be a combination of processors implementing a computing function, for example, a combination of one or more microprocessors, a combination of a DSP and a microprocessor, or the like. The communications module 141 may be a transceiver, a transceiver circuit, a communications interface, or the like. The storage module 142 may be a memory.

Figure 15:
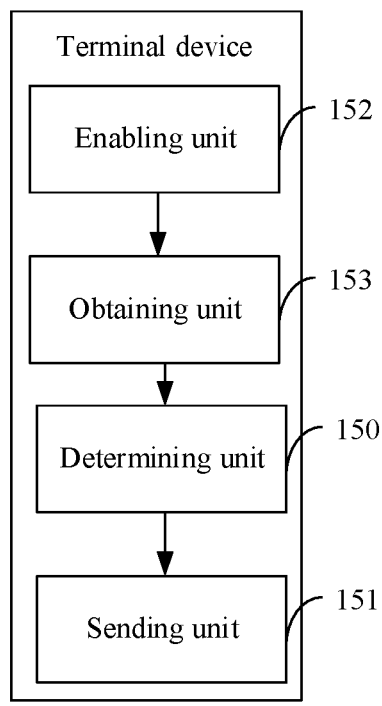
FIG. 15 is a schematic composition diagram of a terminal device according to an embodiment of the present disclosure.

When each function module is obtained through division based on each corresponding function, FIG. 15 is a possible schematic composition diagram of a terminal device. As shown in FIG. 15, the terminal device may include a determining unit 150, a sending unit 151, an enabling unit 152, and an obtaining unit 153.

The determining unit 150 is configured to support the terminal device in performing step 902.

The sending unit 151 is configured to support the terminal device in performing step 501, step 602, step 701, step 802, step 903, and step 1002.

The enabling unit 152 is configured to support the terminal device in performing step 901.

The obtaining unit 153 is configured to support the terminal device in obtaining an activation-related parameter.

It should be noted that all related content of the steps in the foregoing method embodiments may be cited in function descriptions of corresponding function modules. Details are not described herein again. The controller provided in this embodiment of the present disclosure is configured to perform the foregoing session activation method, and therefore can achieve a same effect as the foregoing session activation method.

Figure 16:
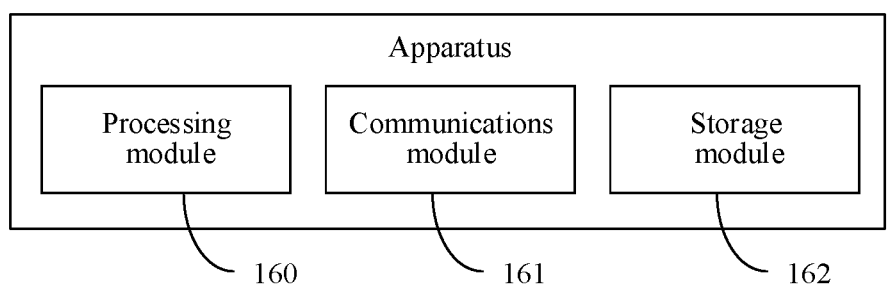
FIG. 16 is a schematic composition diagram of a terminal device according to an embodiment of the present disclosure.

When an integrated unit is used, FIG. 16 shows an apparatus. The apparatus exists in a form of a chip, and the apparatus is configured to perform an action of the terminal device in the foregoing embodiment. As shown in FIG. 16, the apparatus may include a processing module 160 and a communications module 161.

The processing module 160 is configured to control and manage an action of the apparatus. For example, the processing module 160 is configured to support the apparatus in performing step 901 and step 902, and/or is configured to perform another process of the technology described in this specification. The communications module 161 is configured to support the apparatus in communicating with another network entity, for example, communicating with a function module or a network entity shown in FIG. 2. The apparatus may further include a storage module 162, configured to store program code and data that are of the terminal device.

The processing module 160 may be a processor or a controller. The processing module 160 may implement or execute various examples of logical blocks, modules, and circuits described with reference to content disclosed in the present disclosure. Alternatively, the processor may be a combination of processors implementing a computing function, for example, a combination of one or more microprocessors, a combination of a DSP and a microprocessor, or the like. The communications module 161 may be a transceiver, a transceiver circuit, a communications interface, or the like. The storage module 162 may be a memory.

When the processing module 160 is the processor, the communications module 161 is the communications interface, and the storage module 162 is the memory, the apparatus in this embodiment of the present disclosure may be the terminal device shown in FIG. 4.

Figure 17:
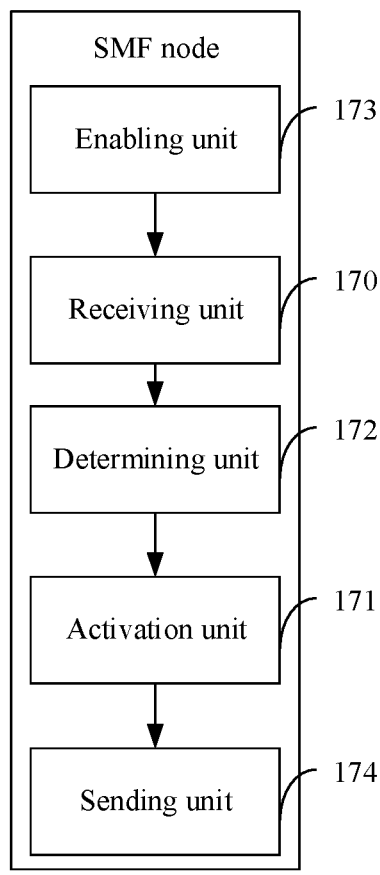
FIG. 17 is a schematic composition diagram of an SMF node according to an embodiment of the present disclosure.

When each function module is obtained through division based on each corresponding function, FIG. 17 is a possible schematic composition diagram of an SMF node. As shown in FIG. 17, the SMF node may be the NWDA node or the PCF node in the foregoing embodiments, and may include a receiving unit 170, an activation unit 171, a determining unit 172, an enabling unit 173, and a sending unit 174.

The receiving unit 170 is configured to support the SMF node in performing step 504, step 5045, step 605, step 703, step 805, and step 905.

The activation unit 171 is configured to support the SMF node in performing step 504, step 606, step 703, step 805, step 905, and step 1004.

The determining unit 172 is configured to support the SMF node in performing the step of determining a to-be-activated PDU session of a terminal device based on an activation-related parameter.

The enabling unit 173 is configured to support the SMF node in performing step 1001.

The sending unit 174 is configured to support the SMF node in performing step 5041, step 5046, and step 5048.

It should be noted that all related content of the steps in the foregoing method embodiments may be cited in function descriptions of corresponding function modules. Details are not described herein again. The SMF node provided in this embodiment of the present disclosure is configured to perform the foregoing session activation method, and therefore can achieve a same effect as the foregoing session activation method.

Figure 18:
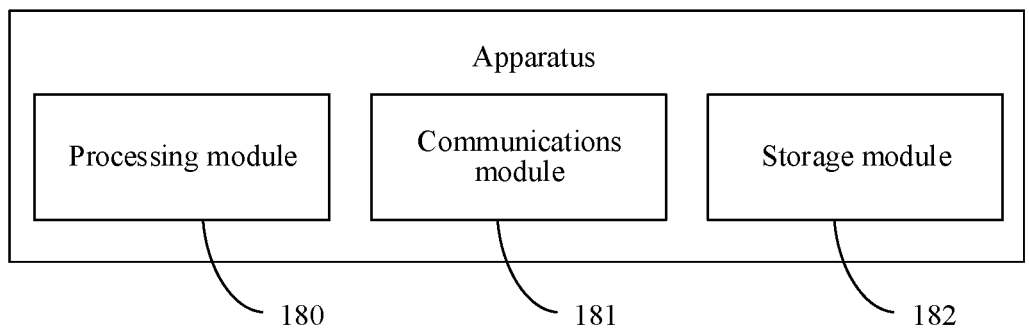
FIG. 18 is a schematic composition diagram of an SMF node according to an embodiment of the present disclosure.

When an integrated unit is used, FIG. 18 shows an apparatus. The apparatus exists in a form of a chip, and the apparatus is configured to perform an action of the SMF node in the foregoing embodiment. As shown in FIG. 18, the apparatus may include a processing module 180 and a communications module 181.

The processing module 180 is configured to control and manage an action of the apparatus. For example, the processing module 180 is configured to support the apparatus in performing the step of determining a to-be-activated PDU session of a terminal device and the step of enabling a prediction function of the terminal device, and/or is configured to perform another process of the technology described in this specification. The communications module 181 is configured to support the apparatus in communicating with another network entity, for example, communicating with a function module or a network entity shown in FIG. 2. The apparatus may further include a storage module 182, configured to store program code and data that are of the SMF node.

The processing module 180 may be a processor or a controller. The processing module 180 may implement or execute various examples of logical blocks, modules, and circuits described with reference to content disclosed in the present disclosure. Alternatively, the processor may be a combination of processors implementing a computing function, for example, a combination of one or more microprocessors, a combination of a DSP and a microprocessor, or the like. The communications module 181 may be a transceiver, a transceiver circuit, a communications interface, or the like. The storage module 182 may be a memory.

The foregoing descriptions about implementations allow a person skilled in the art to understand that, for the purpose of convenient and brief description, division of the foregoing function modules is used as an example for illustration. In actual application, the foregoing functions may be allocated to different function modules and implemented as required, in other words, an inner structure of an apparatus is divided into different function modules to implement all or some of the functions described above.

In the several embodiments provided in this application, it should be understood that the disclosed apparatus and method may be implemented in another manner. For example, the described apparatus embodiments are merely examples. For example, the module or unit division is merely logical function division. There may be another division manner in actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, and may be located in one position, or may be distributed in a plurality of different positions. Some or all of the units may be selected based on an actual requirement to achieve the objectives of the solutions of the embodiments.

In addition, function units in the embodiments of the present disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of the present disclosure essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of the present disclosure. The foregoing storage medium includes any medium that can store program code, such as a USB flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement within the technical scope disclosed in the present disclosure shall fall within the protection scope of the present disclosure. Therefore, the protection scope of the present disclosure shall be subject to the protection scope of the claims.

What is claimed is:

1. A session activation method, comprising:
   receiving, by an access and mobility management function (AMF) node, a service request message from a terminal device; and
   sending, by the AMF node, indication information to a control plane node based on the service request message, wherein the indication information is used to indicate that the AMF node receives the service request message from the terminal device;
   receiving, by the control plane node, the indication information;
   sending, by the control plane node, an identifier of a to-be-activated protocol data unit (PDU) session of the terminal device to a session management function (SMF) node or the AMF node based on the indication information,
   enabling, by the control plane node, a prediction function of the control plane node based on information related to a first prediction function, wherein
   the information related to the first prediction function comprises at least one of the following information: a device type of the terminal device, a service type supported by the terminal device, subscription data of the terminal device, a request message reported by the terminal device, information indicating whether the SMF node supports the prediction function of the control plane node, and information indicating whether the AMF node supports the prediction function of the control plane node; and
   the request message is used to request the control plane node to enable the prediction function of the control plane node.

2. The session activation method according to claim 1, wherein the sending, by the control plane node, an identifier of a to-be-activated PDU session of the terminal device to a session management function (SMF) node or the AMF node based on the indication information comprises:
   obtaining, by the control plane node, an activation-related parameter of the terminal device based on the indication information;
   determining, by the control plane node, the to-be-activated PDU session of the terminal device based on the activation-related parameter; and
   sending, by the control plane node, the identifier of the determined to-be-activated PDU session of the terminal device to the SMF node or the AMF node.

3. The session activation method according to claim 2, wherein the determining, by the control plane node, the to-be-activated PDU session of the terminal device based on the activation-related parameter comprises:
   in case that the activation-related parameter comprises a correspondence between a location area and a PDU session of the terminal device, determining, by the control plane node as the to-be-activated PDU session based on a location area in which the terminal device is currently located and the correspondence, a PDU session corresponding to the location area in which the terminal device is currently located; or
   in case that the activation-related parameter comprises an initial activation moment and an activation period that are of at least one PDU session of the terminal device, determining, by the control plane node, an estimated activation moment of the at least one PDU session based on the initial activation moment and the activation period that are of the at least one PDU session, and determining, as the to-be-activated PDU session, a PDU session that is in the at least one PDU session and whose time difference between an estimated activation moment and a current moment is less than or equal to a first preset threshold, wherein the estimated activation moment is a moment after the current moment; or
   in case that the activation-related parameter comprises a fixed activation moment of at least one PDU session of the terminal device, determining, by the control plane node as the to-be-activated PDU session, a PDU session that is in the at least one PDU session and whose time difference between a fixed activation moment and a current moment is less than or equal to a second preset threshold, wherein the fixed activation moment is a moment after the current moment; or
   in case that the activation-related parameter comprises a correspondence between a PDU session of the terminal device and an associated PDU session, determining, by the control plane node as the to-be-activated PDU session based on the correspondence between the PDU session of the terminal device and the associated PDU session and a PDU session that the terminal device requests to activate, an associated PDU session corresponding to the PDU session that the terminal device requests to activate, wherein the associated PDU session corresponding to the PDU session of the terminal device in the correspondence between the PDU session of the terminal device and the associated PDU session is a PDU session to be activated in a preset time after the PDU session of the terminal device is activated.

4. The session activation method according to claim 1, wherein the service request message comprises an identifier of a PDU session that the terminal device requests to activate; and the method further comprises:
   sending, by the AMF node to the control plane node, the identifier of the PDU session that the terminal device requests to activate; or
   determining, by the AMF node based on the identifier of the PDU session that the terminal device requests to activate, a data network name (DNN) of the PDU session that the terminal device requests to activate, and sending, to the control plane node, the DNN of the PDU session that the terminal device requests to activate; or determining, by the AMF node based on the identifier of the PDU session that the terminal device requests to activate, network slice selection assistance information (NSSAI) of the PDU session that the terminal device requests to activate, and sending, to the control plane node, the NSSAI of the PDU session that the terminal device requests to activate; or determining, by the AMF node based on the identifier of the PDU session that the terminal device requests to activate, a DNN and NSSAI that are of the PDU session that the terminal device requests to activate, and sending, to the control plane node, the NSSAI and the DNN that are of the PDU session that the terminal device requests to activate.

5. The session activation method according to claim 1, wherein the method further comprises:
   receiving, by the AMF node, an identifier of a to-be-activated PDU session of the terminal device from the control plane node; and
   sending, by the AMF node, an activation request message to an SMF node, wherein
   the activation request message comprises the identifier of the to-be-activated PDU session of the terminal device, and the activation request message is used to request the SMF node to activate the to-be-activated PDU session.

6. The session activation method according to claim 1, wherein the control plane node is a network data analytics (NWDA) function node or a policy control function (PCF) node.

7. A system comprising an access and mobility management function (AMF) node, and a control plane node, wherein the AMF node is configured to:
   receive a service request message from a terminal device; and
   send indication information to the control plane node based on the service request message, wherein the indication information is used to indicate that the AMF node receives the service request message from the terminal device; and
   wherein the control plane node is configured to:
   receive the indication information;
   send an identifier of a to-be-activated protocol data unit (PDU) session of the terminal device to a session management function (SMF) node or the AMF node based on the indication information,
   enable a prediction function of the control plane node based on information related to a first prediction function, wherein
   the information related to the first prediction function comprises at least one of the following information: a device type of the terminal device, a service type supported by the terminal device, subscription data of the terminal device, a request message reported by the terminal device, information indicating whether the SMF node supports the prediction function of the control plane node, and information indicating whether the AMF node supports the prediction function of the control plane node; and
   the request message is used to request the control plane node to enable the prediction function of the control plane node.

8. The system according to claim 7, wherein the control plane node is further configured to:

send an identifier of a to-be-activated PDU session of the terminal device to a session management function (SMF) node or the AMF node based on the indication information comprises:
   obtain an activation-related parameter of the terminal device based on the indication information;
   determine the to-be-activated PDU session of the terminal device based on the activation-related parameter; and
   send the identifier of the determined to-be-activated PDU session of the terminal device to the SMF node or the AMF node.

9. The system according to claim 8, wherein the control plane node is further configured to:
   determine the to-be-activated PDU session of the terminal device based on the activation-related parameter comprises:
   in case that the activation-related parameter comprises a correspondence between a location area and a PDU session of the terminal device, determining, by the control plane node as the to-be-activated PDU session based on a location area in which the terminal device is currently located and the correspondence, a PDU session corresponding to the location area in which the terminal device is currently located; or
   in case that the activation-related parameter comprises an initial activation moment and an activation period that are of at least one PDU session of the terminal device, determining, by the control plane node, an estimated activation moment of the at least one PDU session based on the initial activation moment and the activation period that are of the at least one PDU session, and determining, as the to-be-activated PDU session, a PDU session that is in the at least one PDU session and whose time difference between an estimated activation moment and a current moment is less than or equal to a first preset threshold, wherein the estimated activation moment is a moment after the current moment; or
   in case that the activation-related parameter comprises a fixed activation moment of at least one PDU session of the terminal device, determining, by the control plane node as the to-be-activated PDU session, a PDU session that is in the at least one PDU session and whose time difference between a fixed activation moment and a current moment is less than or equal to a second preset threshold, wherein the fixed activation moment is a moment after the current moment; or
   in case that the activation-related parameter comprises a correspondence between a PDU session of the terminal device and an associated PDU session, determining, by the control plane node as the to-be-activated PDU session based on the correspondence between the PDU session of the terminal device and the associated PDU session and a PDU session that the terminal device requests to activate, an associated PDU session corresponding to the PDU session that the terminal device requests to activate, wherein the associated PDU session corresponding to the PDU session of the terminal device in the correspondence between the PDU session of the terminal device and the associated PDU session is a PDU session to be activated in a preset time after the PDU session of the terminal device is activated.

10. The system according to claim 7, wherein the service request message comprises an identifier of a PDU session that the terminal device requests to activate; and wherein the AMF node is further configured to:
   send to the control plane node, the identifier of the PDU session that the terminal device requests to activate; or determine based on the identifier of the PDU session that the terminal device requests to activate, a data network name (DNN) of the PDU session that the terminal device requests to activate, and sending, to the control plane node, the DNN of the PDU session that the terminal device requests to activate; or determine based on the identifier of the PDU session that the terminal device requests to activate, network slice selection assistance information (NSSAI) of the PDU session that the terminal device requests to activate, and sending, to the control plane node, the NSSAI of the PDU session that the terminal device requests to activate; or determine based on the identifier of the PDU session that the terminal device requests to activate, a DNN and NSSAI that are of the PDU session that the terminal device requests to activate, and sending, to the control plane node, the NSSAI and the DNN that are of the PDU session that the terminal device requests to activate.

11. The system according to claim 7, wherein the AMF node is further configured to:
receive an identifier of a to-be-activated PDU session of the terminal device from the control plane node; and
send, an activation request message to an SMF node, wherein
the activation request message comprises the identifier of the to-be-activated PDU session of the terminal device, and the activation request message is used to request the SMF node to activate the to-be-activated PDU session.

12. The system according to claim 7, wherein the control plane node is a network data analytics (NWDA) function node or a policy control function (PCF) node.

* * * * *